(12) United States Patent
Nikkanen et al.

(10) Patent No.: US 10,791,310 B2
(45) Date of Patent: Sep. 29, 2020

(54) METHOD AND SYSTEM OF DEEP LEARNING-BASED AUTOMATIC WHITE BALANCING

(71) Applicant: Intel Corporation, Santa Clara, CA (US)

(72) Inventors: Jarno Nikkanen, Kangasala (FI); Lauri Suomela, Tampere (FI); Joni-Matti Määttä, Tampere (FI)

(73) Assignee: Intel Corporation, Santa Clara, CA (US)

(*) Notice: Subject to any disclaimer, the term of this patent is extended or adjusted under 35 U.S.C. 154(b) by 88 days.

(21) Appl. No.: 16/150,153

(22) Filed: Oct. 2, 2018

(65) Prior Publication Data

US 2019/0045163 A1 Feb. 7, 2019

(51) Int. Cl.
| | | |
|---|---|---|
| *H04N 9/73* | (2006.01) | |
| *H04N 1/60* | (2006.01) | |
| *H04N 9/64* | (2006.01) | |
| *G06N 3/08* | (2006.01) | |

(52) U.S. Cl.
CPC ............ *H04N 9/735* (2013.01); *G06N 3/08* (2013.01); *H04N 1/6077* (2013.01); *H04N 9/646* (2013.01)

(58) Field of Classification Search
CPC .......... H04N 9/735; H04N 9/73; H04N 9/646; H04N 1/6077; G06T 7/90; G06T 3/4046; G06T 5/20; G06T 5/40; G06T 2207/10016; G06T 2207/20076; G06T 2207/20072
See application file for complete search history.

(56) References Cited

U.S. PATENT DOCUMENTS

| 9,386,289 | B2 | 7/2016 | Tuna et al. | |
|---|---|---|---|---|
| 9,398,280 | B2 | 7/2016 | Nikkanen et al. | |
| 2003/0020826 | A1* | 1/2003 | Kehtarnavaz | H04N 5/2351 348/362 |
| 2006/0203311 | A1* | 9/2006 | Weng | H04N 1/6027 358/516 |
| 2009/0021602 | A1* | 1/2009 | Fujiwara | H04N 5/23219 348/223.1 |
| 2009/0201374 | A1* | 8/2009 | Hung | H04N 9/735 348/187 |
| 2010/0195172 | A1* | 8/2010 | Sawada | H04N 1/6077 358/516 |
| 2015/0002693 | A1* | 1/2015 | Cabral | H04N 9/735 348/224.1 |
| 2017/0237961 | A1* | 8/2017 | Barron | G06T 5/001 348/223.1 |
| 2019/0098274 | A1* | 3/2019 | Douady-Pleven | G06T 5/50 |
| 2019/0158796 | A1* | 5/2019 | Wang | G06K 9/6218 |

OTHER PUBLICATIONS

Aytekin, et al., "A Dataset for Camera Independent Color Constancy", IEEE Transactions on Image Processing, vol. 27, No. 2; Feb. 2018.

(Continued)

*Primary Examiner* — Kelly L Jerabek
(74) *Attorney, Agent, or Firm* — Green, Howard & Mughal LLP.

(57) ABSTRACT

A system, article, and method to perform deep learning-based automatic white balancing uses a neural network in conjunction with other non-neural network automatic white balancing algorithms.

25 Claims, 15 Drawing Sheets

(56) References Cited

OTHER PUBLICATIONS

Aytekin, et al., "Deep multi-resolution color constancy", IEEE International Conference on Image Processing (ICIP), Beijing, 2017.

Baslamisli, Anil, "Camera Sensor Invariant Auto White Balance Algorithm Weighting", MSC Thesis, Tampere University of Technology; 2016.

Drew, et al., "Illumination-invariant color object recognition via compressed chromaticity histograms of color-channel-normalized images", International Conference on Computer Vision; pp. 533-540, 1998.

Drew, et al., "Illumination-invariant image retrieval and video segmentation", Pattern Recognition; vol. 32, No. 8; pp. 1369-1388, 1999.

Finlayson, et al., "Using colour for image indexing", The challenge of image retrieval. A workshop on Content Based Image & Video Retrieval, 1998.

Gevers, et al., "Color-based object recognition", Pattern Recognition, vol. 32; pp. 453-464, 1999.

Hu, et al., "FC4: Fully Convolutional Color Constancy with Confidence-weighted Pooling", Computer Vision and Pattern Recognition (CVPR); Jul. 2017; 10 pages.

Nikkanen, J.T. , "Color Constancy by Characterization of Illumination Chromacity", Optical Engineering; vol. 50; No. 5; 2011.

Qian, et al., "Recurrent Color Constancy", IEEE International Conference on Computer Vision (ICCV), pp. 5459-5467, Venice; 2017.

Qian, Yanlin et al., "Deep structure-ouput regression learning for computational color constancy", 23 International Conference on Pattern Recognition (ICPR); pp. 1899-1904; Cancun; 2016.

Swain, et al., "Color indexing", International Journal of Computer Vision, vol. 7, No. 1, pp. 11-31, Nov. 1991.

Wyszecki, et al., "Color Science", Concepts and Methods, Quantitative Data and Formulae, 2nd Edition, p. 12 and p. 146, 2000.

\* cited by examiner

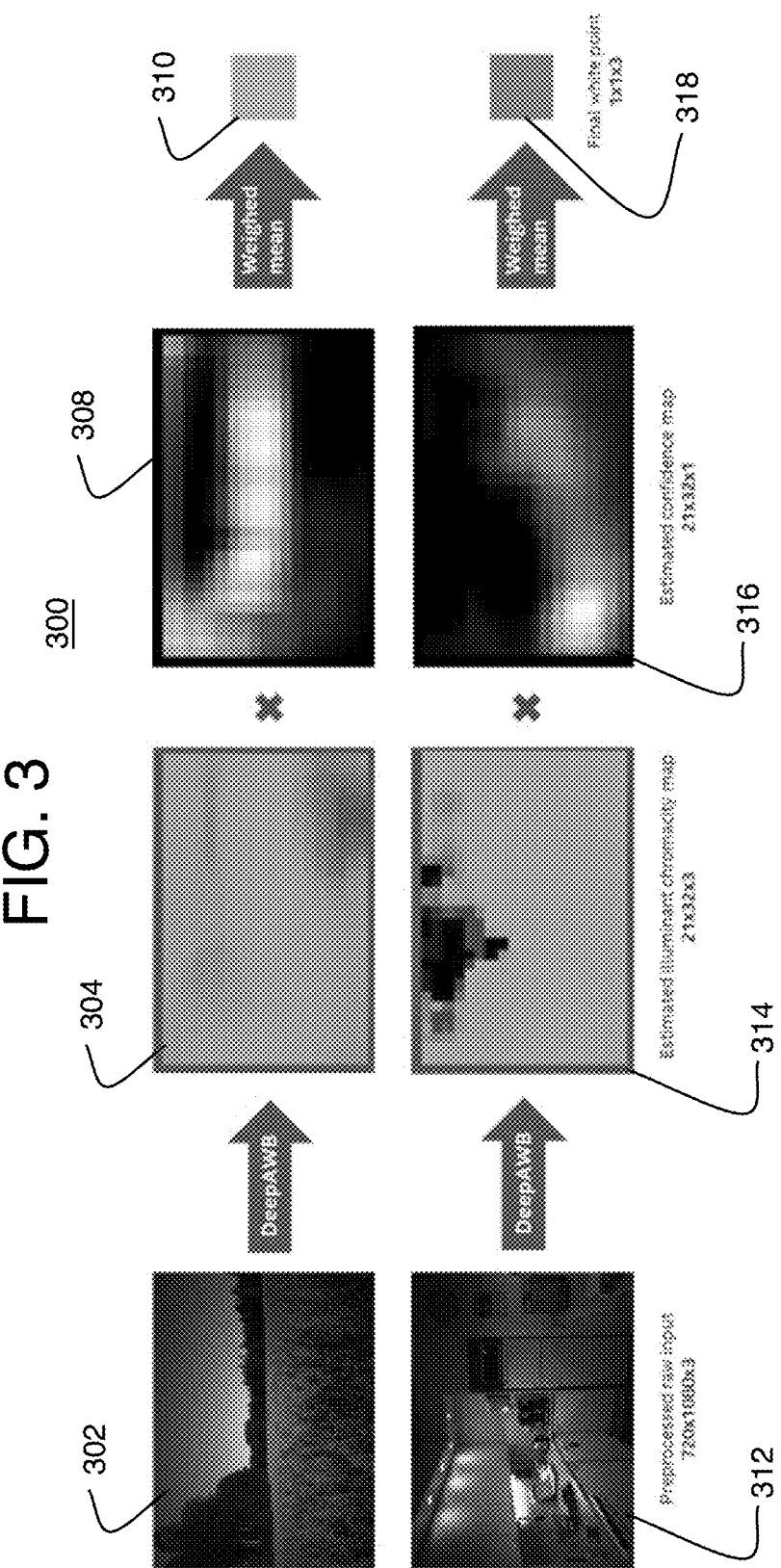

OBTAIN IMAGE DATA OF AT LEAST ONE IMAGE 402

↓

INPUT THE IMAGE DATA TO AT LEAST ONE CONVOLUTIONAL NEURAL NETWORK (CNN) ARRANGED TO PROVDE AT LEAST ONE AUTOMATIC WHITE BALANCE (AWB) WHITE POINT ESTIMATE AND HAVING AT LEAST ONE CHROMATICITY MAP CHANNEL AND AT LEAST ONE CONFIDENCE MAP CHANNEL WITH CONFIDENCE ESTIMATE VALUES TO BE USED AS WEIGHTS TO APPLY TO VALUES OF THE CHROMATICITY MAP CHANNEL(S) 404

↓

DETERMINE A NORMALIZING CONFIDENCE MAP WEIGHT BASED AT LEAST IN PART ON THE INDIVIDUAL CONFIDENCE ESTIMATE VALUES 406

↓

DETERMINING A BASE WHITE POINT ESTIMATE COMPRISING USING BOTH A WEIGHTED WHITE POINT ESTIMATE OF THE CNN AND WEIGHTED BY THE NORMALIZING CONFIDENCE MAP WEIGHT, AND A WEIGHTED WHITE POINT ESTIMATE OF AT LEAST ONE NON-CNN AWB ALGORITHM 408

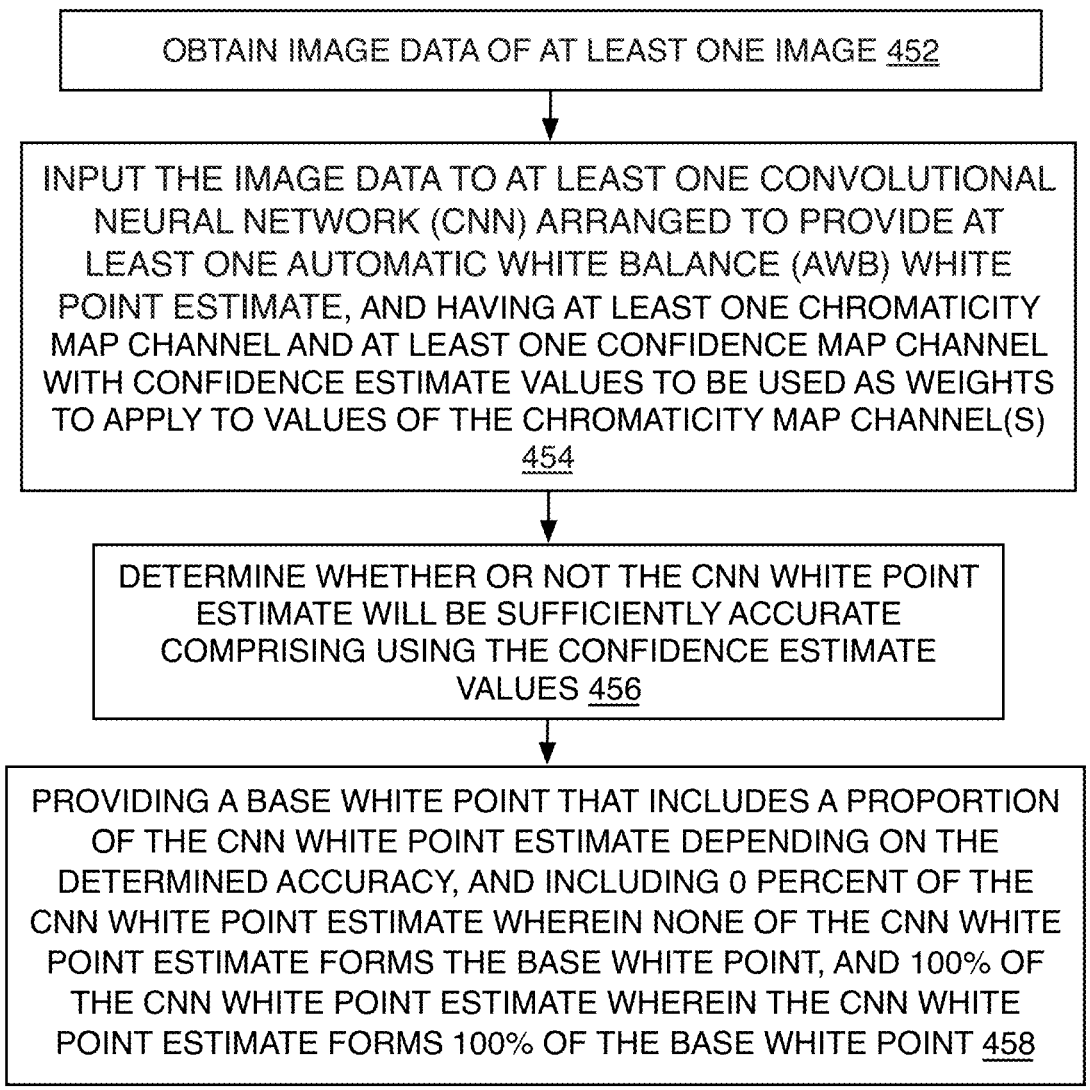

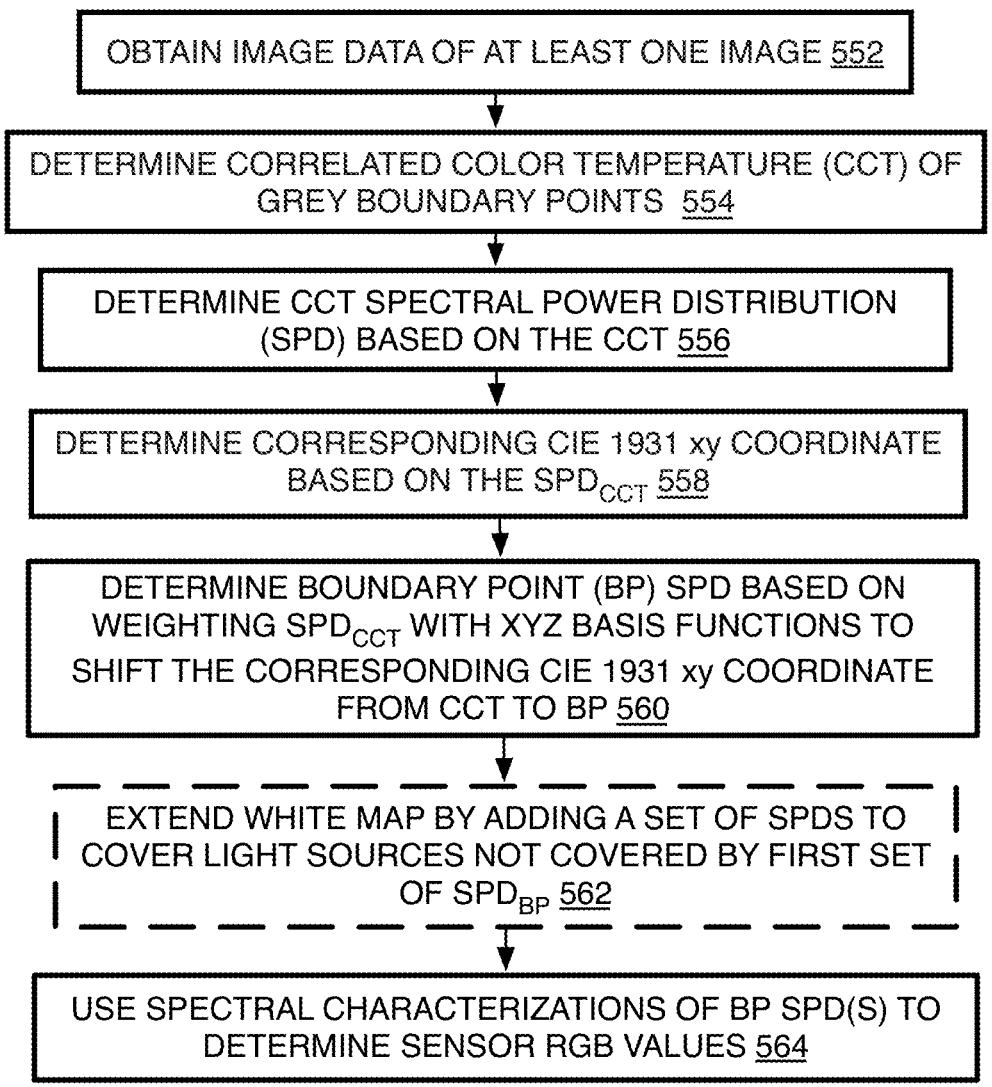

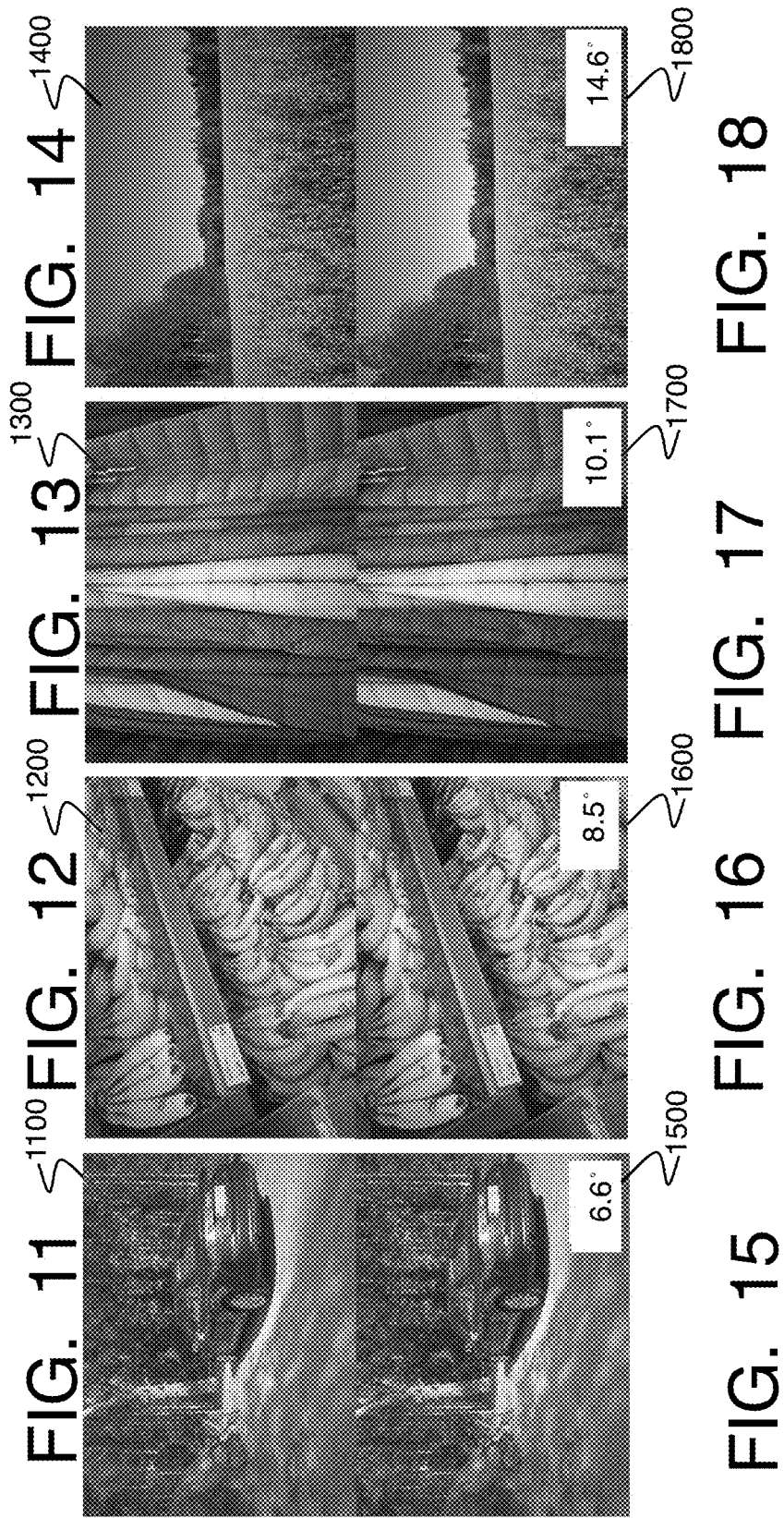

METHOD AND SYSTEM OF DEEP LEARNING-BASED AUTOMATIC WHITE BALANCING

BACKGROUND

Many digital cameras automatically adjust for white balance. Specifically, when illumination sources change from scene to scene, such as from natural daylight outdoors to indoor lighting, an automatic white balance (AWB) algorithm estimates the white point (WP) in order to factor the changes in illumination source. All other colors are based on the white point. When successful, this achieves color constancy where a color appears to be the same color no matter the illumination source. However, conventional AWB algorithms often have problems with complex scenes with multiple illumination sources for example. One solution is to use convolutional neural network (CNN) algorithms that have been found to improve color accuracy and constancy in such situations as long as the lighting situation for a scene is one that is familiar to such a network such that the network was trained to recognize the particular illumination or illuminant combination used. Thus, many color errors arise because new types of scenes not experienced by the network before cannot be adequately analyzed. The typical CNN training dataset is too small to generalize to an adequate number of illumination situations that are typically experienced around the world. This results in picture quality that is noticeably low to a user. Also, in many cases, camera invariance is poor such that the CNN for one camera sensor is not necessarily good for a different camera sensor because the raw image data from different cameras can result in different illumination chromaticity.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a graphic flow chart showing a method of neural network automatic white balancing according to at least one of the implementations herein;

FIG. 4A is a flow chart of a method of automatic white balancing using neural networks and other AWB algorithms according to at least one of the implementations herein;

FIG. 4B is a flow chart of another method of automatic white balancing using neural networks and other AWB algorithms according to at least one of the implementations herein;

FIG. 5B is a flow chart of a method of white map generation for automatic white balancing according to at least one of the implementations herein;

FIGS. 11-18 are ground truth images compared to images with varying error rates to demonstrate the differences between different angles;

DETAILED DESCRIPTION

Figure 1:
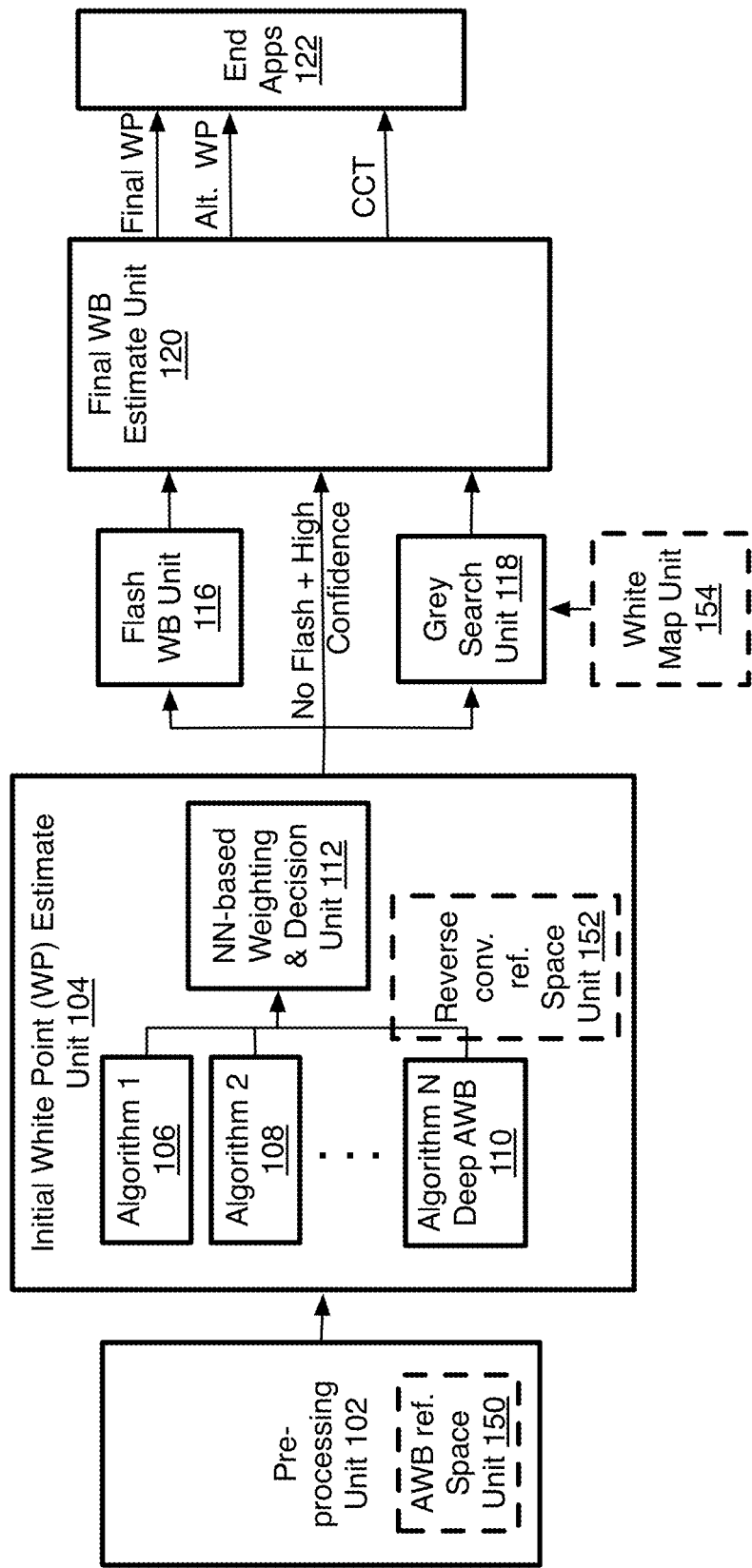
FIG. 1 is a schematic diagram of an image processing device according to at least one of the implementations herein.

One or more implementations are now described with reference to the enclosed figures. While specific configurations and arrangements are discussed, this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages including neural network accelerators, and/or various computing devices and/or consumer electronic (CE) devices such as imaging devices, digital cameras, smart phones, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of performing deep learning-based automatic white balancing.

Automatic white balancing (AWB) involves solving a color constancy problem that is applied after spatial color correction for accurate reproduction of colors in the reconstructed image. White balancing mimics the unique ability of the human visual system to perceive the appearance of the objects with the same color under different illumination conditions. The AWB algorithm seeks to find chromaticity coordinates that define the color neutral "white" object on the image or the white point. Once the chromaticity of the light source is estimated, different color channels of the input image are corrected with the white balancing gains so to keep the appearance of the white in the output image constant.

Conventional AWB algorithms still have many difficulties with accuracy for complex illumination situations. There are still many cases that lead to clear color errors. Thus, convolutional neural networks (CNNs) have become popular tools for many kinds of image analysis problems including for performing AWB because they tend to handle complex illumination situations well. See for example, Anil Baslamisli, "Camera Sensor Invariant Auto White Balance Algorithm Weighting", MSc thesis, Tampere University of Technology (2016); Yanlin Qian, et al., "Deep structured-output regression learning for computational color constancy", 23rd International Conference on Pattern Recognition (ICPR), pp. 1899-1904, Cancun (2016) (referred to as Yanlin-1 herein); Yanlin Qian, et al., "Recurrent Color Constancy", IEEE International Conference on Computer Vision (ICCV), pp. 5459-5467, Venice, (2017) (referred to as Yanlin-2 herein); Çağlar Aytekin, et al., "Deep multi-resolution color constancy", IEEE International Conference on Image Processing (ICIP), Beijing (2017) (referred to as Aytekin-1 herein); and Çağlar Aytekin, et al., "A Dataset for Camera Independent Color Constancy", IEEE Transactions on Image Processing, Vol. 27, No. 2, (February 2018) (referred to as Aytekin-2 herein).

The published CNN methods work well for selected academic databases where a single database usually has about 0.5-3 k images, with a total amount of about 20 k images including various published databases. Difficulties arise, however, because many CNNs for AWB are not trained on an annotated dataset of sufficient size to provide accurate AWB to cover an acceptable amount of the illumination environments known throughout the world, such that the 20 k images still is an insufficiently low number of images. Thus, new types of illumination in scenes in combination with new scene content not experienced by a neural network before (or in other words, those types of illumination not included in the known databases for example) result in poor quality white point estimation. The current amount of illumination environments and scene content covered by the dataset in the known databases simply is not enough to reach a level of desired generalization ability for real products to be adequately operated around the world.

Adding to these difficulties, ground truth annotation of images for adding more data to the AWB databases often requires such high expertise and expensive equipment that it cannot be extensively performed by non-experts around the world rather than at the main manufacturer/designer (or designated entity). This considerably slows down the accumulation of data and growth of the database.

Another difficulty with performing AWB by using CNNs is that, in most cases, camera invariance is poor, which is the ability to operate on (or generalize to) previously unseen camera sensor types. Camera invariance is not enabled automatically via CNNs because the exact same raw image from one camera sensor can result in different illumination chromaticity for a different camera sensor. Simply training a neural network with many different camera sensor types does not solve this problem and produces poor accuracy instead because the differences in sensor types adds too many variables to the CNN training on such a relatively small dataset, thereby degrading the accuracy. For example, exactly the same raw image might provide different illuminations for different camera sensors, due to the difference in camera spectral response. Thus, when exactly the same raw image value is given as input to a CNN, and which could have resulted from two different illuminations for two different camera sensors that have different spectral responses, the CNN would be required to give two different outputs for the same input, which is not possible if all camera sensors are just lumped in the same training set. Also, this would require an extremely large training dataset to be captured for each different sensor, which is practically impossible.

Yet another difficulty with AWB accuracy relates to the calibration of cameras to generate a white map and baseline RGB values for the camera in order to perform AWB grey-based algorithms such as a grey-search that refines the definition of grey for images captured by a certain camera sensor and also provide a white point estimate. The grey definition is then used to determine a white point of the image. A white map is a camera characterization which defines the range of viable white points for the camera and that can be used to determine which chromaticity values are potential grey areas in an image. The grey areas can be used to estimate illumination chromaticity since grey areas do not change the chromaticity of illumination when light is reflected from them. The calibration to determine a white map to be used for the images for the AWB operations often requires a relatively large amount of image quality (IQ) tuning before the AWB operations can be performed accurately because of the large amount of new raw images that need to be captured to cover the range of possible illumination chromaticities. This may involve manual tweaking of the white maps and/or other such algorithm parameters to establish a baseline white point and RGB pixel values. This can take for example a number of days to weeks of AWB image capture and tuning effort. Currently, the time consumed, and the resulting achieved quality level depend significantly on the project parameters, project quality targets, and the experience of the image quality (IQ) tuning engineer, making this manual process susceptible to many errors that can reduce image quality.

To resolve these issues, the method and system herein introduces deep learning AWB combined with other non-neural network camera control AWB algorithms in a way that compensates for annotated datasets for the neural network that are insufficiently small by orders of magnitude. The present camera AWB methods perform well all over the world and with a very large variety of illumination environments. Thus, the present AWB methods work well with scenes that are very different from anything that the AWB CNN has seen during training, thereby limiting or completely avoiding significant noticeable failures.

The present AWB methods disclosed herein use both CNN-based sub-algorithms and non-CNN based algorithms. Non-CNN algorithm or non-CNN white point (or white point estimate) are those that do not use a neural network, although the non-CNN algorithms may use a neural network to test the adequacy of the white point estimate instead, such as by forming a weight for the algorithm output. By one approach, the estimated white point from the CNN algorithm and the non-CNN algorithms are weighted and combined to form a "base" weighted white point estimate. This base white point (or white point estimate) could be a final AWB white point to set gains or refine RGB pixel values to provide to other non-AWB applications, or could be a final white point estimate of an initial AWB stage (or really an initial white point estimate) that may actually be further refined until a true final white point estimate is generated by other modules to set gains or refined RGB values provided to non-AWB applications.

As to the improvement of scene invariance, both the CNN and non-CNN white point estimates are weighted and combined in proportions indicated by their weights to form the base white point estimate. This includes when it is determined the CNN weight or confidence is zero or close to zero, which may indicate the dataset of the CNN still was not sufficiently large for a particular image being analyzed. In this case, the base white point estimate may entirely (or close to entirely) form the non-CNN algorithms, which can be said to be performing as the fallback in this case. Otherwise, the opposite may be included as well where the CNN white point estimate has a high confidence or weight value when the non-CNN white point estimate(s) have zero (or close to zero) confidence (or weight). Many proportions between these two cases can be used to combine the white point estimates to form the base white point. This provides a great increase in adaptivity by providing more or all of the white point estimate from the algorithm for a particular image including the high accuracy CNN-based algorithm, or in other words, results in increased scene invariance so that the scenes with illumination not yet experienced by the CNN can still obtain good results by one of the AWB algorithms or some combination of them. The non-CNN algorithms may include maxRGB, grey-world, shades of grey, grey-edge, gamut-mapping, color correlation, and so forth.

The CNN operation itself is made more accurate by using a confidence estimate channel in addition to the chromaticity defined channels (such as three RGB channels one for each color). The confidence estimate channel is used as weights for the other chromaticity channels, and then a combination value, such as an average, is used to form the RGB white point estimate from the three chromaticity channels. These channels are provided by deep AWB layers at the end of the CNN, and thereafter, the confidence estimate values are applied as weights to the chromaticity channels at an adaptive pooling layer. The confidence estimate values also are used to form a normalizing confidence estimate weight for the CNN white point estimate for combination with the non-CNN algorithms described herein. The normalizing confidence estimate weight is formed by a normalization function that divides the average of the confidence estimate values of a confidence map forming the confidence estimate channel, and divided by the standard deviation of the confidence map.

As to the camera sensor invariance issue, it has been found that performing the AWB algorithms in a reference space substantially improves the invariance of the CNN and other AWB algorithms. This operation may involve transforming RGB sensor data into the reference space, and then back again to the RGB sensor space once the white point estimates are established. The reference space is formed by normalizing the spectral characterizations of multiple different types of sensors such as by determining a combination of the sensor RGB space parameters, such as an average. This improves camera invariance by creating reference values that are closer to the values of any one camera sensor versus the direct difference between values of one camera sensor compared to another camera sensor. This makes support of new camera sensors feasible, especially since capturing new training data is not feasible in real products due to the enormous effort associated with such capture and training, and the time consumed for such operations. The addition of a new spectral characterization can be performed within one or two hours for a new camera sensor, or the information even can be obtained from camera module vendors to generate the reference space parameters. Other details are provided below.

As to the white map issue, the spectral characterizations also can be used to calculate white maps in order to automate baseline tuning of a camera sensor's chromaticity space. Generally, the methods disclosed herein perform this by determining the spectral power distribution of grey boundary points on a shifted color space, and then using spectral characterizations of the boundary point spectral power distribution to determine sensor RGB values. This results in less IQ tuning effort where the spectral characterization of the camera module is required and forms a baseline, but no manual tweaking of white maps and/or other such algorithms parameters is needed. The white maps are generated from the same, unchanging spectral characterization. This can significantly reduce the number of days of AWB image capture and tuning effort needed. With this technique, high quality images are achieved consistently with much less time spent generating the baseline chromaticity values for the camera sensor and without heavy dependency on varying project parameters, project quality targets, and the experience of the IQ tuning engineer as mentioned above.

By using the techniques mentioned above, better accuracy is achieved with about a 30% to 65% reduction in bad failure cases compared to conventional AWB systems such as that disclosed in Aytekin-2 cited above and others tested below. Thus, the present methods generate images from a camera with higher color accuracy just about no matter the lighting environment and scene contents in the scene captured by a camera, achieved with less Image Quality (IQ) tuning effort and less expertise required from IQ tuning engineers.

Referring to FIG. 1, an image processing device 100 performs the AWB and other related methods described herein and has a pre-processing unit 102 to process raw image data from one or more camera sensors at least sufficient for AWB but could also include pre-processing for all 3A operations including automatic exposure control (AEC) and automatic focus (AF) in addition to the AWB or other image processing applications that improve the quality of images captured by one or more cameras. As described below, the pre-processing unit 102 may include an AWB reference space unit 150 to perform color space conversions from RGB sensor space to a spectral-based reference space as described below and for performing the AWB operations in the reference space for greater sensor invariance. A reverse conversion reference space unit 152 to convert the reference space data back to RGB sensor space can be provided in a number of different places in the AWB pipeline (or device) 100, but shown here at the initial WB estimate unit 104 to be applied after the CNN white point estimate is generated in the reference space.

The device 100 also has an initial white point (WP) estimate unit 104. The WP est. unit 104 uses two or more AWB algorithms shown as algorithm units 106, 108 and 110 including at least one algorithm N that is a deep AWB algorithm, or in other words, a neural network-based AWB algorithm, and in the present examples, an AWB convolution neural network (CNN) is used. The CNN has at least one convolutional layer that provides AWB channels to output primary chromaticity color space channels with values of an estimated CNN white point, and by using a confidence estimate channel to modify the white point estimate values as described herein. The other AWB algorithms 1, 2, etc. are non-CNN (or non-neural network) algorithms that do not use a CNN to generate an estimated white point. The types of algorithms such as grey-world and so forth are listed elsewhere herein. Such algorithms, however, could use a CNN or other neural network to establish weights to apply to the non-CNN white points as described below.

A neural network-based weighting and decision (NNWD) unit 112 determines a base white point estimate for further refinement processing, and could be at least partly based on the CNN white point estimate. By one option, the NNWD unit 112 combines a weighted CNN white point with weighted white points from other non-CNN algorithms to compute the base white point for further processing. By this option, the weighting of the CNN white point may be performed by using a normalizing function that provides better scene invariance due to its good results in accurately setting the confidence for the CNN white point estimate and therefore resulting in good quality images even when an illumination environment has not been experienced by the CNN before. This includes when the weight is 0 for the CNN algorithm, and it is not included in the base white point estimate when it is known that the CNN algorithm is inadequate for a certain situation (such as a certain illumination environment). If not adequate, then one or more of the non-CNN algorithms are used as a fallback to provide the base white point estimate and at an image quality that is acceptable, making the system very adaptable to different illumination environments.

A flash white balance unit 116 then handles the initial white point when a flash or light projector was used to capture an image in order to adjust the chromatic image values accordingly before a final WP estimate unit 120 determines a final white point. If no flash was used, and there was high confidence in the CNN-based white point estimate, then the process proceeds directly to the final WB estimate unit 120. Otherwise, when no flash was used but the confidence in the CNN-based white point is low, then a grey-search unit 118 performs a grey search to refine the grey areas of an image before the final white point analysis is performed by the final WP estimate unit 120 to apply a grey-related AWB algorithm. This may involve limiting the color correlation range (CCT).

By one form, the grey-search unit 118 uses a white map from a white map unit 154 to be used to set baseline RGB values from initial white point candidates from the white map and to provide a final white point estimate. More details regarding a grey-search are provided below. The conventional technique may be used to provide the white map but otherwise a faster more efficient spectral image characterization technique is used by the white map unit 154 that increases IQ tuning efficiency and by gathering information about illumination chromaticity distribution in CIExy color space with a spectral characterization of the camera module obtained by analyzing images at specific separate wavelengths, and then estimating the spectral power distribution for each CIExy coordinate of grey boundaries as explained below. These white maps are determined and uploaded during calibration of a camera for example.

The final WB estimate unit 120 performs AWB algorithms such as various memory-color-based and preferred color reproduction-based algorithms that might still modify the white point, particularly after the grey-search was applied. Otherwise, the same non-CNN algorithms as used with the initial WB estimate unit, such as grey-related algorithms mentioned herein and/or other AWB algorithms, may be used to provide the final white point based on color appearance modeling, an "accurate" white point upon white point stabilization techniques (when no flash is used) and calculates the CCT for the resulting white point.

End applications 122 may receive the final and accurate white points and CCT to set chromaticity values for one or more images according to the set white point. The End applications also may receive gains to form refined chromaticity values based on the final white point or may receive the AWB adjusted chromaticity values themselves. Such end applications 122 may include various video and photo capture applications that use the AWB to adjust image data quality whether for capturing further images or for display applications including for camera preview screens on mobile devices and other photo and video capture and display applications on many different capture and display devices. Other end applications highly reliant on the AWB include computer vision tasks such as object recognition.

Figure 2:
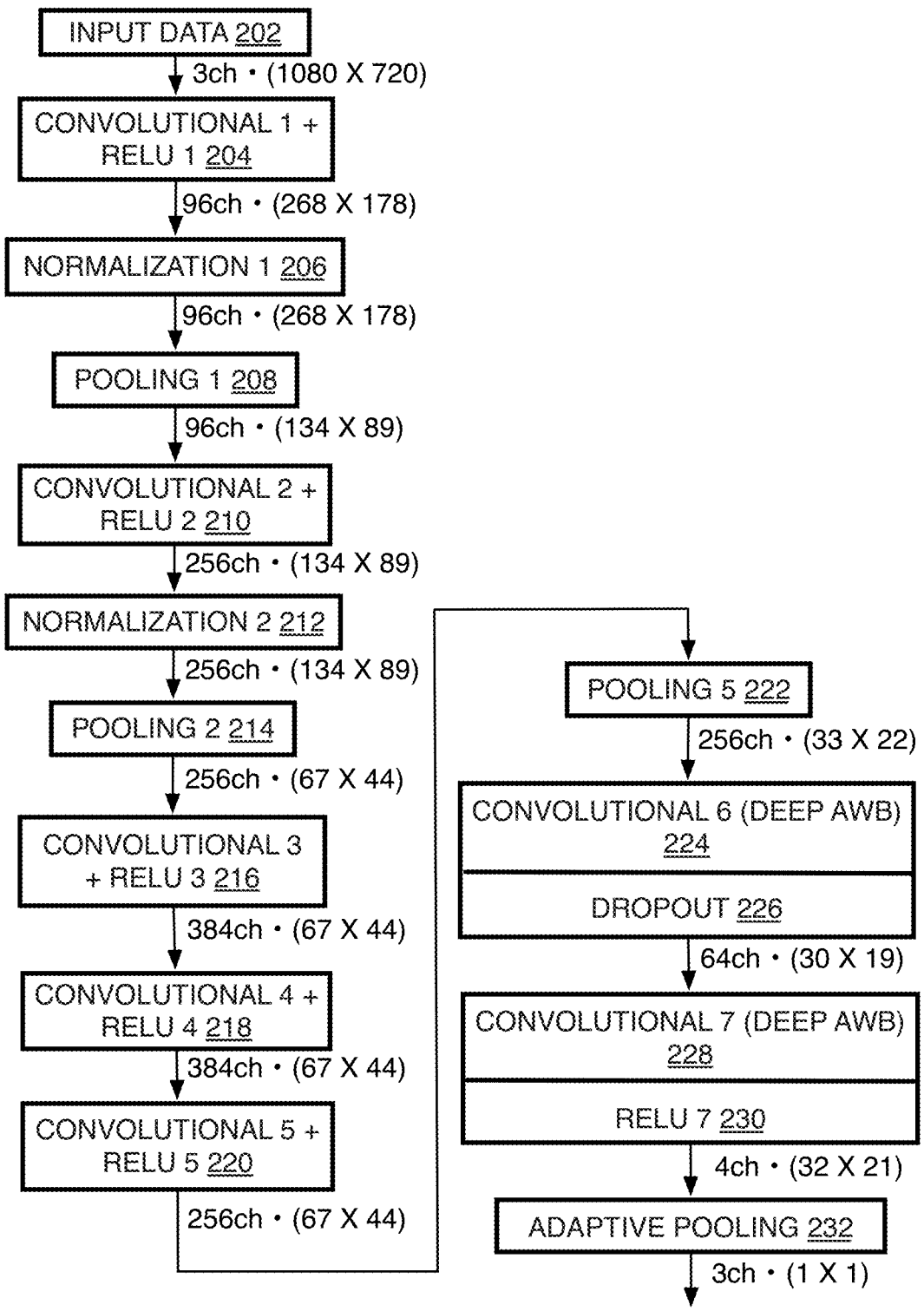
FIG. 2 is a schematic diagram of a neural network performing automatic white balancing according to at least one of the implementations herein.

Referring to FIG. 2, a neural network 200 that is the algorithm N operated by the deep AWB unit 110 outputs an estimated CNN white point estimate. The neural network receives pre-processed image pixel data 202 in an expected color space such as RGB, and may receive three color values R, G, B in vector form. The example shown here on network 200 shows that the 1080×720 pixel images are being provided with one for each RGB color.

Although many different network architectures could be used, network 200 provides one example architecture. A section of the network each has one convolutional layer numbered as follows. The network includes a convolution layer 1 with a rectified linear unit (ReLU) layer to remove negative signs thereafter 204. The layer 204 provides 96 channels at 268×178 feature maps each. The next layer is a normalization layer 1 206 that provides the channel structure as the previous layer 1. A pooling layer 1 208 is then provided and outputs 96 channels at 134×89 feature maps each to complete a section 1 of the network. In a next section 2, a convolution+ReLU layer 2 210 is an expanding layer and provides 256 channels at 134×89 feature maps each, and then a normalization layer 2 212 provides the same map size as the channels on the previous layer. A pooling layer 2 214 then provides 256 channels at 67×44 feature maps each.

By other forms, these earlier layers of the network architecture 200 could be replaced with a SqueezeNet architecture that uses 1×1 point-wise filters for example (see, Iandola, F. N. et al., "Squeezenet: Alexnet-Level Accuracy With 50× Fewer Parameters And <0.5 MB Model Size", ICLR (2017)) thereby reducing the number of parameters further, and in turn reducing the power consumption to operate the AWB.

The next section then has a single layer with a convolutional+ReLU layer 3 216 providing 384 channels at 67×44 feature maps each, and then a convolutional+ReLU layer 4 218 maintains the same channel size and number as the previous layer. Then, a convolutional+ReLU layer 5 220 has 256 channels at the same size as the previous layer. A pooling layer 5 222 maintains the same number of channels from the previous layer but with much smaller feature maps each (33×22).

The last two convolution layers of the network are considered Deep AWB layers. This includes a convolution layer 6 (Deep AWB) 224 that is coupled with a dropout 226 that reduces the channels to 64 at 30×19 feature map each. Thereafter, a convolutional 7 (deep AWB) layer 228 has a ReLU part or layer 7 230 that provides four channels at 32×21 feature map each. Here, one channel is provided for each primary chromaticity R, G, and B, and the fourth channel is a confidence estimate channel. The four layers are provided to an adaptive pooling layer 232. The adaptive pooling layer provides the three chromaticity values for a base white point (or base white point estimate). The base white point estimate may be a final white point to form gains and/or refined RGB values used by other applications, but in most cases, will be considered an initial white point that is analyzed to be refined further and provided to the final white balance unit 120 (FIG. 1), for example.

Figure 2A:
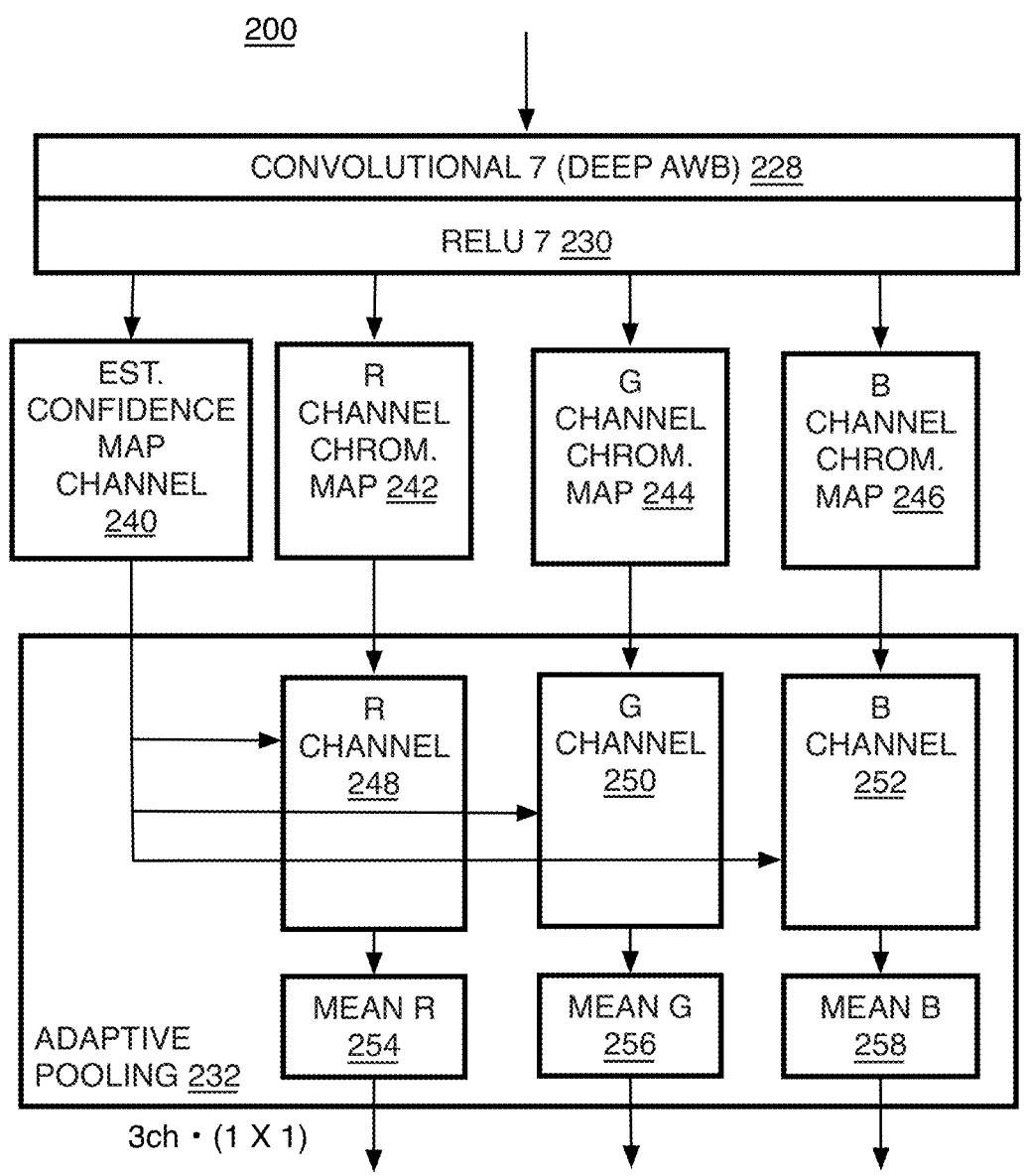
FIG. 2A is a schematic diagram of example deep automatic white balance (AWB) layers of the neural network of FIG. 2.

Referring to FIG. 2A, the adaptive pooling layer 232 is explained in detail. In the conventional AWB CNNs, the last convolutional layer of the network outputs the illumination RGB channels and that typically would be combined into one RGB illuminant estimate vector via one or more fully connected layer(s). In the network 200 herein, fully connected layers are not used. Instead, the convolution layer 228 (with ReLU 230) generates a fourth channel (estimate confidence map channel or just confidence channel) 240 that provides or is a 2D confidence map that indicates the image areas that are most likely to produce a reliable illuminant estimate. The last convolutional layer 7 228/230 also generates the three chromaticity channels or maps 242, 244, and 246 for the three primary chromaticity values to form the white point estimate. The adaptive pooling layer 232 applies the confidence map as weights to the other three channels 242, 244, and 246. By one form, this is an element by element operation, such as with a dot product operation, to form weighted chromaticity values in weighted maps 248, 250, and 252. The mean of each of the three RGB channel weighted maps 248, 250, and 252 is then computed and used as the CNN white point estimate of the CNN, and forms a resulting RGB vector that represents the illuminant estimate.

Referring to FIG. 3, another way to summarize the operations of the neural network with the adaptive pooling layer is shown graphically with two example input images 302 and 312 formed of pre-processed raw input at 720×1080×3 channels each. The neural network is applied respectively forming estimated illuminant chromaticity maps 304 and 314 of 21×32×3 for each image. These are respectively multiplied element by element by estimated confidence maps 308 and 316 respectively at 21×32×1. This results in a weighted mean value 310 and 318 respectively for each primary chromaticity channel resulting in the final white point vector 1×1×3.

With regard to training of the neural network, an error function that is used in training is an angular error between the RGB vector of the output CNN white point estimate and the ground truth vector. Hence, the neural network learns to output such combinations of 2D illuminant estimates and confidence maps for the CNN output white point c where the angular error ε is minimized (as the loss function for training the NN):

$$\varepsilon_{c,c_{GT}} = \arccos\left(\frac{c \cdot c_{GT}}{\|c\|\|c_{GT}\|}\right) \tag{1}$$

where GT stand for ground truth.

Referring to FIG. 4A, an example process 400 is a computer-implemented method of neural network automatic white balancing for image processing, and particularly to operating an AWB convolutional neural network with a confidence estimate channel, and determining the adequacy (or confidence weight) of the resulting CNN white point estimate to generate a base white point estimate. In the illustrated implementation, process 400 may include one or more operations, functions or actions as illustrated by one or more of operations 402 to 408 numbered evenly. By way of non-limiting example, process 400 may be described herein with reference to example image processing devices (or networks) 100, 200, 300, and 1900 of FIGS. 1-3 and 19 respectively, and where relevant.

Process 400 may include "obtain image data of at least one image" 402. This may include obtaining raw image data streamed from a camera module or other image capture module. The camera module, such as camera module 1902 (FIG. 19), may be part of a single image capture device that includes the disclosed AWB system, or it may be remote from the disclosed system. This operation also may include sufficient pre-processing to perform AWB. This may involve black-level correction, lens shading corrections, linearization (in other words, linearization of an image sensor's response curve for tone correction). By one form, the image data may be in the form of a statistics grid providing blue/green and red/green color ratios in the RGB color space. This may be provided to match the units of the chromaticity space that will be used. Thus, other units or statistics could be used instead depending on the chromaticity space. The image data also may be downsampled as needed.

Process 400 may include "input the image data to at least one convolutional neural network (CNN) arranged to provide at least one automatic white balance (AWB) white point estimate and having at least one chromaticity map channel and at least one confidence map channel with confidence estimate values to be used as weights to apply to values of the chromaticity map channel(s)" 404. As already described above, this operation involves inputting the image data to an AWB CNN, such as CNN 200, to generate three chromaticity channels and at least one confidence estimate (or confidence map) channel. As described above, the extra channel that forms the confidence map includes confidence estimate values trained to weight the other chromaticity channels. Once the confidence map is used to weight the chromaticity channels at an adaptive pooling layer as the last or near last layer of the CNN, each weighted channel is then reduced to a single value, such as by an average, to provide a single chromaticity value as one of the primary color coordinates for a CNN white point estimate as an output of the CNN algorithm, thereby providing a 1×1×3 vector as the CNN white point estimate.

Process 400 then may include "determine a normalizing confidence map weight based at least in part on the individual confidence estimate values" 406, and in one example, both an average of the confidence estimate values and the standard deviation of the confidence estimate values. Specifically, the 2D confidence map is reduced into a single weight value as below, for example, in which a function $f$ is to normalize the confidence estimate values to a range of [0,1]:

$$w_{CNN} = f\left(\frac{\text{mean(Confidence map)}}{\text{std(Confidence map)}}\right) \quad (2)$$

where std is the standard deviation of the confidence map. The weight $W_{CNN}$ is the weight that can be applied to an output CNN white point estimate $C_{CNN}$ and as a confidence value. This is a low computational complexity implementation that provides very good results because it so accurately reflects the confidence of the CNN white point. It will be appreciated that there could be other ways to combine the mean and standard deviation or other values could be used instead of, or in addition to, the mean and standard deviation values of the confidence map that would also work to indicate the adequacy (or accuracy) of the CNN white point. This could include training a separate neural network for this function.

Process 400 next may include "determine a base white point estimate comprising using both a weighted white point estimate of the CNN and weighted by the normalizing confidence map weight, and a weighted white point estimate of at least one non-CNN AWB algorithm" 408. Here, the disclosed method and system provide a more accurate white point by using the CNN white point when the confidence for the CNN white point is high, but when the confidence is low, then using one or more non-CNN algorithms as a fallback option. More precisely though, the weighted white points of both the CNN and non-CNN algorithms are placed in an equation that uses a proportion of each result (AWB CNN and AWB non-CNN) according to the weights applied to the two types of AWB algorithms. Thus, the confidence estimate $W_{CNN}$ provides the weighting between a deepAWB illuminant estimate and the non-CNN AWB algorithm illuminant estimates. This permits more of the CNN white point estimate to be used when the CNN is based on a sufficient training dataset and provides better accuracy than the non-CNN algorithms, but uses more of the non-CNN algorithms for better quality when the result of the CNN algorithm is of poor quality, such as when the training dataset was too small. As more and more training data is added, the frequency of using the fallback option is expected to decrease. The combined base white point estimate is computed as:

$$c_{BASE} = w_{CNN} \cdot c_{CNN} + \sum_{i=1}^{N} w_i \cdot c_i, \; w_{CNN} \sum_{i=1}^{N} w_i = 1 \quad (3)$$

where N is the number of non-CNN algorithms being used, $c_i$ is the white point estimate of a non-CNN algorithm, and $w_i$ are the non-CNN weights for each non-CNN algorithm. The weights $w_i$ may be determined by heuristics based, for example, on the size of the color gamut for a certain image (the bigger the gamut, the more likely the estimate is accurate), or by training another neural network to evaluate the confidence of an algorithm for a certain input image such as disclosed by Baslamisli (cited above) that uses neural networks to determine the likelihood of success for each different type of non-CNN algorithm being tested. It will be appreciated that one or more non-CNN AWB algorithms may be included in the equation here.

$C_{BASE}$ may by the "final" initial white point estimate that is to be refined by other AWB modules, or may be the final white point that is used to compute gains and adjust color values, any of which may be provided to other non-AWB applications that use the white point (or gains or image data already modified by applying the white point).

Referring to FIG. 4B, an example process 450 is a computer-implemented method of neural network automatic white balancing for image processing, and particularly for determining a base white point by using both CNN-based white point estimates and non-CNN white point estimates. In the illustrated implementation, process 450 may include one or more operations, functions or actions as illustrated by one or more of operations 452 to 464 numbered evenly. By way of non-limiting example, process 400 may be described herein with reference to example image processing devices (or networks) 100, 200, 300, and 1900 of FIGS. 1-3 and 19 respectively, and where relevant.

Process 450 may include "obtain image data of at least one image" 452, and this is as described with operation 402 of process 400 above.

Process 450 may include "input the image data to at least one convolutional neural network (CNN) arranged to output at least one automatic white balance (AWB) CNN white point estimate, and having at least one chromaticity map channel and at least one confidence map channel with confidence estimate values to be used as weights to apply to values of the chromaticity map channel(s)" 454. This also is described above, and the explanation applies equally here.

Process 450 may include "determine whether or not the CNN white point estimate will be sufficiently accurate comprising using the confidence estimate values" 456, and as explained above for operation 406 (Process 400), this includes forming a normalizing confidence estimate weight for the CNN white point estimate, and this may involve a normalizing function that normalizes the confidence estimate values of the confidence map channel, and by one example, by using both the mean and standard deviation of the confidence map, and by one form, dividing the mean by the standard deviation to compute the CNN weight. Otherwise, other computations with the confidence map values could be used to determine the confidence estimate weight.

Process 450 may include "providing a base white point that includes a proportion of the CNN white point estimate depending on the determined accuracy, and including alternatives of 0 percent of the CNN white point estimate wherein none of the CNN white point estimate forms the base white point, and 100% of the CNN white point estimate wherein the CNN white point estimate forms 100% of the base white point" 458. This is provided to clarify that in addition to the proportional use of the AWB CNN and non-CNN algorithms, weights of 0 and 1 can still happen which results in a situation that effectively replaces the CNN white point with one or more of the non-CNN algorithm results or vice-versa. In the former case, the CNN algorithm may be considered the main AWB method, while the non-CNNs are considered the fallback method.

Alternatively, the CNN white point may be entirely replaced when the CNN weight $W_{CNN}$ is within a certain threshold of 0 (or the sum of $w_i$'s is within a certain threshold of 1 (or 100%)), and the opposite may be true for using 100% of the CNN weight without using any of the non-CNN algorithm white points when the $W_{CNN}$ weight is within a certain threshold of 1 (or the sum of $w_i$'s is within a certain threshold of 0).

Figure 5A:
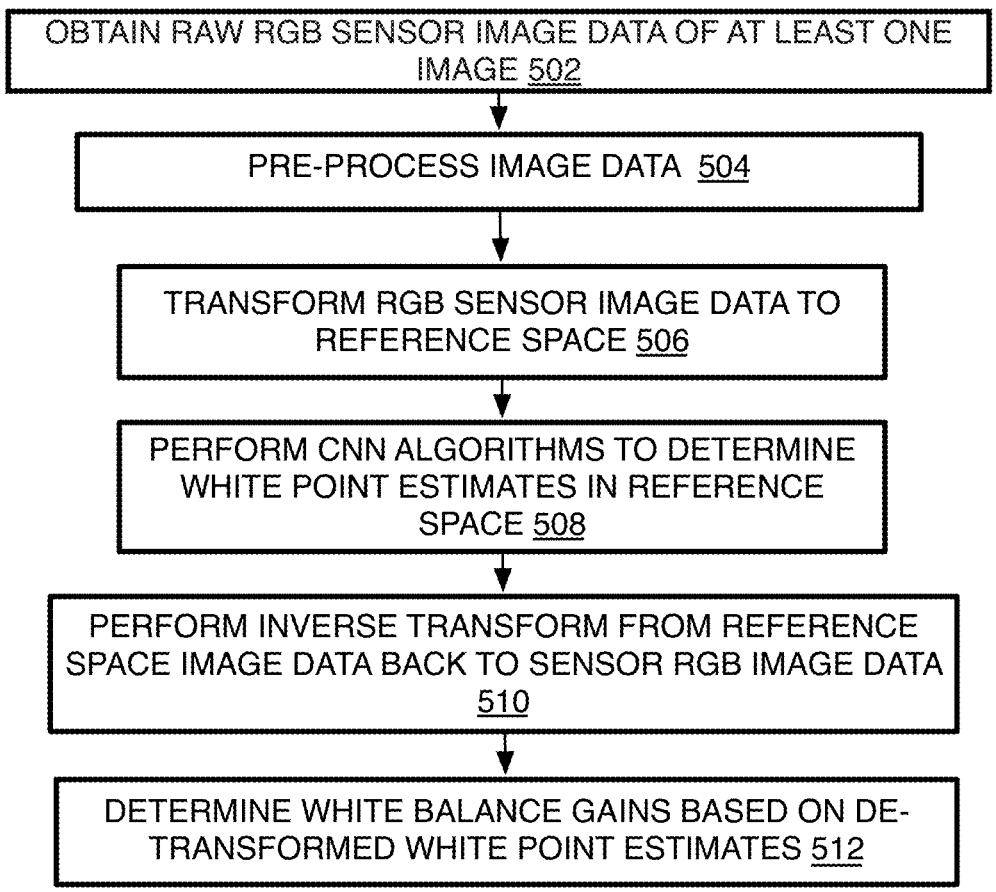
FIG. 5A is a flow chart of a method of camera invariant automatic white balancing according to at least one of the implementations herein.

Referring to FIG. 5A, an example process 500 is a computer-implemented method of neural network automatic white balancing for image processing, and particularly to using a reference space to perform the CNN AWB operations. In the illustrated implementation, process 500 may include one or more operations, functions or actions as illustrated by one or more of operations 502 to 512 numbered evenly. By way of non-limiting example, process 500 may be described herein with reference to example image processing devices (or networks) 100, 200, and 1900 of FIGS. 1-2 and 19 respectively, and where relevant A color space transformation process is used to increase camera invariance for the CNN AWB operations described herein, thereby raising the quality of the images for a much wider variety of camera sensor types. The details are provided as follows.

Process 500 may include "obtain raw RGB sensor image data of at least one image" 502, and where the images are obtained to perform AWB processing as described above with processes 400 and 450.

Process 500 may include "pre-process image data" 504, which may include at least performing black level subtraction, optional linearization (for tone correction for example), and color shading correction, as well as other pre-processing operations as described above for process 400 and 450.

Process 500 may include "transform RGB sensor image data to reference space" 506. Particularly, camera invariance is achieved by transforming the sensor RGB image data to a reference color space used to perform the AWB operations described herein. Such a reference space may be some average or other representative space, based on average or some other combined chromaticity values for example, and of multiple different camera sensors to reduce the maximal differences between color spaces since the difference from one particular camera sensor to another specific camera sensor can be sufficiently large to cause color errors. Thus, a good choice for the reference color space is one that corresponds to average spectral response of the primaries of typical camera sensors (e.g. selected Sony and OVT camera modules), to avoid large conversion coefficients that can amplify errors more. The pre-processed input sensor RGB image data may be transformed to the reference space via a 3×3 matrix operation:

$$x' = G \cdot x \quad (4)$$

$$= \begin{vmatrix} wR'/wR & 0 & 0 \\ 0 & wG'/wG & 0 \\ 0 & 0 & wB'/wB \end{vmatrix} \quad (5)$$

where such transform matrices are known. The matrix is used to calculate transform chromaticity values of a color space similar to sRGB color correction matrix (CCM) calculations, for example. Here, the calculations may be at least partly based on spectral responses of the camera and target color space primaries, which by one example are sampled in a range of 380 nm to 780 nm inclusive on 5 nm intervals for example.

Process 500 then may include "perform CNN algorithms to determine white point estimates in reference space" 508. This may include both the training of the AWB as well as at least the operation of the AWB CNN algorithm to obtain a CNN white point estimate, although the non-CNN AWB algorithms could be operated in the reference space as well, including the AWB operations after the CNN white point estimate is established and through the generation of a final white point, when desired.

Process 500 may include "perform inverse transform from reference space image data back to sensor RGB image data" 510, and finally an inverse matrix may be applied to transform the reference space image data back to sensor RGB image data.

Thereafter, process 500 may include "determine white balance gains based on de-transformed white point estimates" 512, thereby adjusting the chromaticity values of the rest of the image data based on the determined final white point (whether determined by using the CNN algorithms in the reference space alone and factoring the non-CNN algorithms thereafter, or both the CNN and non-CNN algorithms determined in the reference space).

Referring to FIG. 5B, an example process 550 is a computer-implemented method of automatic white balancing for image processing, and particularly to generating a white map for certain AWB algorithms that define grey areas of an image. In the illustrated implementation, process 550 may include one or more operations, functions or actions as illustrated by one or more of operations 552 to 564 numbered evenly. By way of non-limiting example, process 550 may be described herein with reference to example image processing devices (or networks) 100, 200, and 1900 of FIGS. 1-2 and 19 respectively, and where relevant.

As mentioned above, a grey-search may be applied when the confidence of the base white point $C_{BASE}$ from the initial WP estimate unit is low. The decision to apply the grey-search may be performed by computing an initial or base white point weight $W_{BASE}$ for the initial or base white point $C_{BASE}$ (equation 3) and comparing the weight $W_{BASE}$ to a threshold for example. The weight $W_{BASE}$ may be computed by $W_{BASE}=\max(w_i)$, $i \in \{1, \ldots, N\}$, with variables from equation (3) above except that here $w_i$ also includes $W_{CNN}$. When the weight $W_{BASE}$ is under the threshold, a grey-search is applied in order to refine the initial white point. Thus, by one example, when none of the weights of the CNN and non-CNN algorithms are above the threshold, then the grey-search is applied. Note that since the weights $w_i$ were defined to sum to 1 in equation (3), the confidence per algorithm in this part is a non-scaled weight that does not necessarily sum to 1. The grey-search will provide a refined white point that could be used as a final white point or could be refined further as mentioned below.

The grey-search and other conventional baseline AWB algorithms may require a "white map" as the camera characterization, and which defines the range of viable white points in terms of linearized camera sensor raw [R/G, B/G] image data in real life imaging conditions. The white map can then be used by a grey-search sub-algorithm to determine grey areas of a particular image, which are then used by full grey-based AWB algorithms to generate white point estimates. The white map can be calculated based on the spectral characterization of a camera module that can be obtained by measuring the response of the camera module at different visible wavelengths such as from 380 nm to 780 nm by one example, and by capturing a raw image per each wavelength stimuli produced. This is accomplished by using a monochromator device and then calculating the spectral response for each color component from those raw images. A camera sensor independent illumination chromaticity distribution is defined in a CIExy color space. This CIExy white map can be converted to camera dependent chromaticity plane by using spectral characterization of the camera module and by estimating a spectral power distribution (SPD) for individual CIExy coordinates as explained herein. This significantly reduces the time and effort of IQ tuning as described below.

To accomplish these tasks, process 550 may include "obtain image data of at least one image" 552, and this may include obtaining raw image data that is not preprocessed yet. This also may take place in a calibration stage of the camera or camera product, such as a computing device including a smartphone. The calibration stage may occur before a camera is sold to consumers for example.

Figure 6:
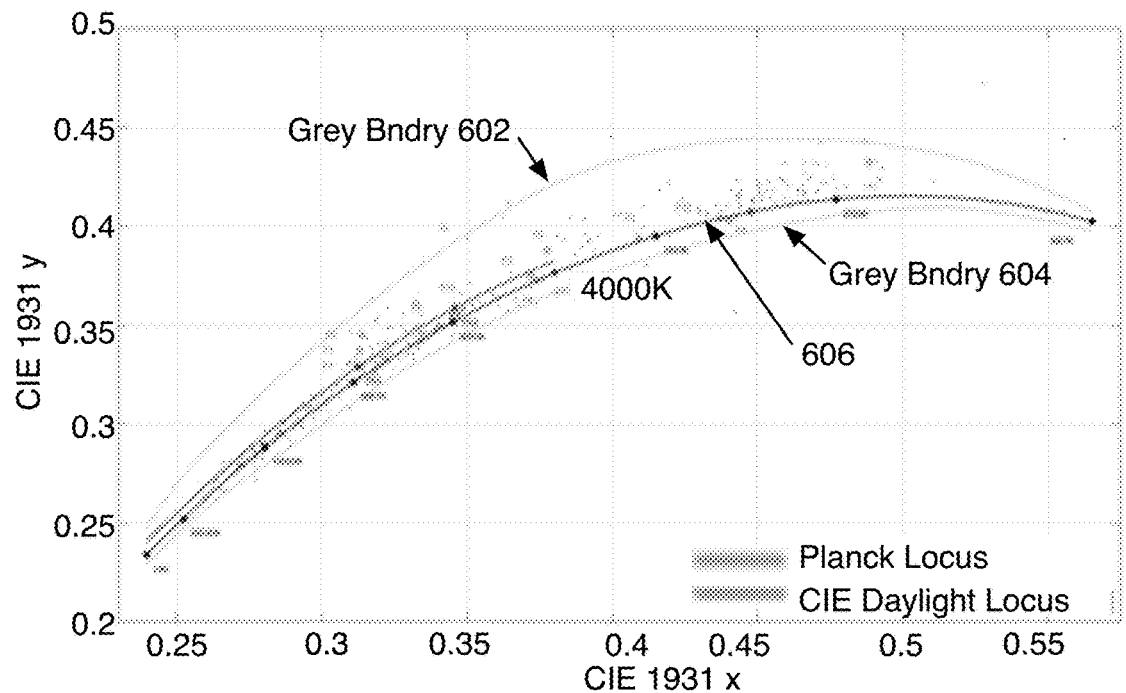
FIG. 6 is a graph of a CIE 1931 xy chromaticity plane showing grey boundaries.

Referring to FIG. 6, the white map can be defined in a camera-agnostic manner in the generic CIE 1931 xy chromaticity plane by mapping the light grey upper and lower bounds 602 and 604 on the plane graph 600, above and below the black Planck locus (blackbody radiator locus) 606. Some highly chromatic light sources such as low pressure sodium lamps are intentionally left out from this white map to avoid overly influencing the boundary locations. The generic grey boundaries, and specifically the boundary points (BPs) defining the grey boundaries, need to be converted into the camera [R/G, B/G] color space in order to be used to set the grey areas for a camera sensor.

Initial conversion from CIExy chromaticity plane to camera [R/G, B/G] can be done by generating candidate Spectral Power Distributions (SPDs) for the boundary points of the CIE xy white map, and using the spectral characterization $\{S_R, S_G, S_B\}$ to calculate the corresponding sensor RGB values as follows:

To determine grey boundaries in the camera [R/G, B/G] space, process 550 may include "determine correlated color temperature (CCT) of grey boundary points" 554. Thus, for each boundary point $xy_{BP}$ in the CIE xy chromaticity plane, a correlated color temperature $CCT_{BP}$ is first calculated. This is performed by plotting xy coordinates of the points on the CIE xy chromaticity plane and reading the indicated CCTs which are set on the plane by known formulas.

Process 550 then may include "determine CCT spectral power distribution (SPD) based on the CCT" 556. Specifically, given $CCT_{BP}$, $SPD_{CCT}$ is calculated based on the CIE daylight model (for >4000K) or Black Body Radiator model (<4000K), also given proper smooth transition between the two models in a vicinity of the 4000K. These are commonly known equations to calculate SPD based on CCT, for daylight and for black body radiator, and can be found, for one example, in G. Wyszecki and W. S. Stiles, "Colour Science", 2nd edition, Hoboken, N.J.: Wiley, 2000".

Process 550 may include "determine corresponding CIE 1931 xy coordinate based on the $SPD_{CCT}$" 558. Here, the corresponding CIE 1931 xy is calculated from $SPD_{CCT}$ (denoted by $xy_{CCT}$) and accomplished by SPD to CIExy conversion, such as those included, for example, in Matlab OptProp toolbox. The conversion may be performed by multiplying the CIE X, Y, Z basis functions with the SPD and calculating the resulting X, Y, and Z (thereby integrating the SPD as a function of the wavelength) and then calculating x and y.

Process 550 may include "determine boundary point (BP) SPD based on weighting $SPD_{CCT}$ with XYZ basis functions to shift the corresponding CIE 1931 xy coordinate from CCT to BP" 560. This is solved by an error function optimizer. The error function is the Euclidean distance between the original xyBP and the current xyBP' that corresponds to the current $SPD_{BP}$'. The parameters that are changed during the optimization are the weights for the different XYZ basis functions. Once the difference is small enough, the optimizer concludes that the correct $SPD_{BP}$ has been reached. Thus, boundary point $SPD_{BP}$ is calculated by starting from $SPD_{CCT}$, and weighting the SPD with XYZ basis functions to move the corresponding CIE 1931 xy from $xy_{CCT}$ to $xy_{BP}$. After calculating $SPD_{BP}$, the corresponding sensor RGB can be calculated by:

$$X = \int_{\lambda=380}^{780} S_X(\lambda) \cdot SPD_{BP}(\lambda), \ X \in \{R, G, B\} \quad (6)$$

where S is the spectral characterization $\{S_R, S_G, S_B\}$ mentioned above, and $\lambda$ is wavelength.

Process 550 optionally may include "extend white map by adding a set of SPDs to cover light sources not covered by first set of $SPD_{BP}$" 562, and this is accomplished by adding the SPDs of those additional light sources on the list of SPDs to convert to [R/G, B/G] on top of the $SPD_{BP}$ SPDs. This should include the SPDs of at least all the CIE F series fluorescent light sources, and a representative set of LED light sources, to complement the daylight and black body type of light sources that are well covered by $SPD_{BP}$ SPDs). For some camera sensors especially at the lower boundary, might be too strict to cover some fluorescent light sources with very spiky SPDs that produce very greenish illumination chromaticity. Hence, the white map can be further extended based on an additional set of SPDs that covers those light source types (mostly relevant for greenish fluorescent light sources that extend more in the greenish illumination direction for some camera sensors).

Process 550 may include "use spectral characterizations of BP SPDs to determine sensor RGB values" 564, and this provides the white map in the camera RGB color space. Specifically, $SPD_{BPS}$ for each or individual CIExy white map boundary points is determined thereby forming a white map from the SPDs by equation (6), and the resulting white map is in terms of camera RGB in a [R/G, B/G] chromaticity plane.

By one form, a grey-search algorithm then may be performed that refines the initial (or base) white point and provides a final accurate white point. Such an algorithm is disclosed by Nikkanen, J. T., "Color Constancy by Characterization of Illumination Chromaticity", Optical Engineering, 50(5), 057204 (2011). The final WB estimate unit 120 (FIG. 1) then may refine the final white point further by using various memory color based and preferred color reproduction based algorithms that might still modify the white point.

Figure 7:
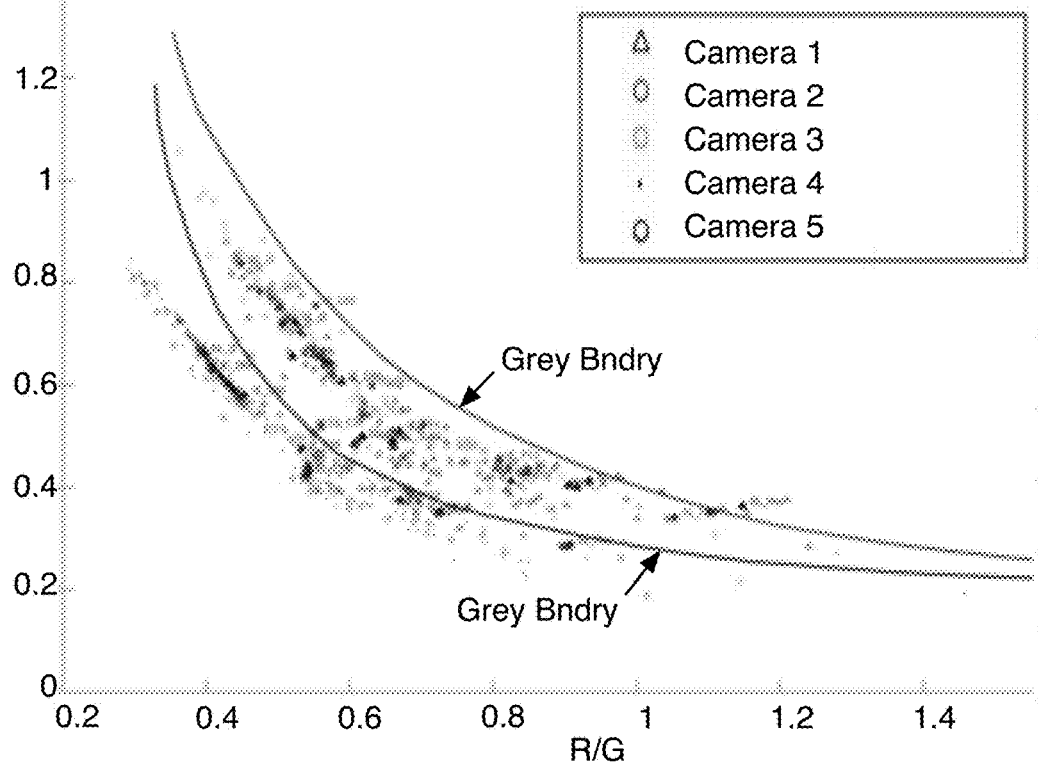
FIGS. 7-9 are graphs of resulting white maps for three cameras tested in accordance with at least one of the implementations herein and showing linearized raw [R/G, B/G] data generated automatically from the generic CIE 1931 xy white map.
Figure 8:
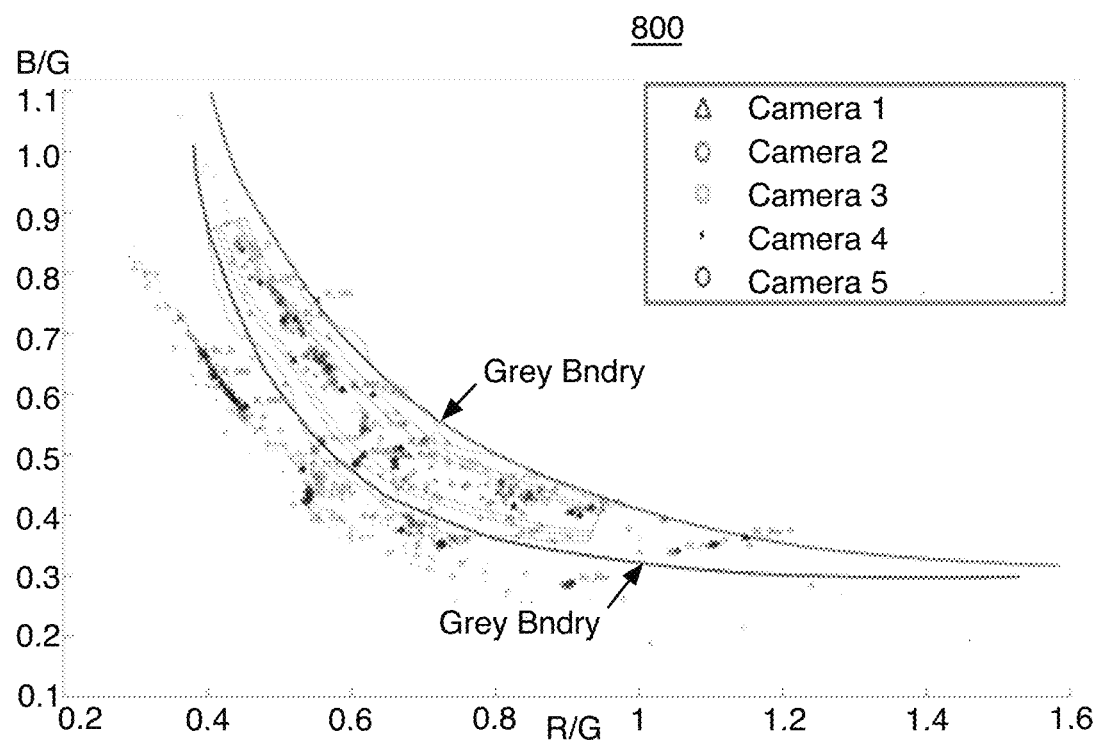
Figure 9:
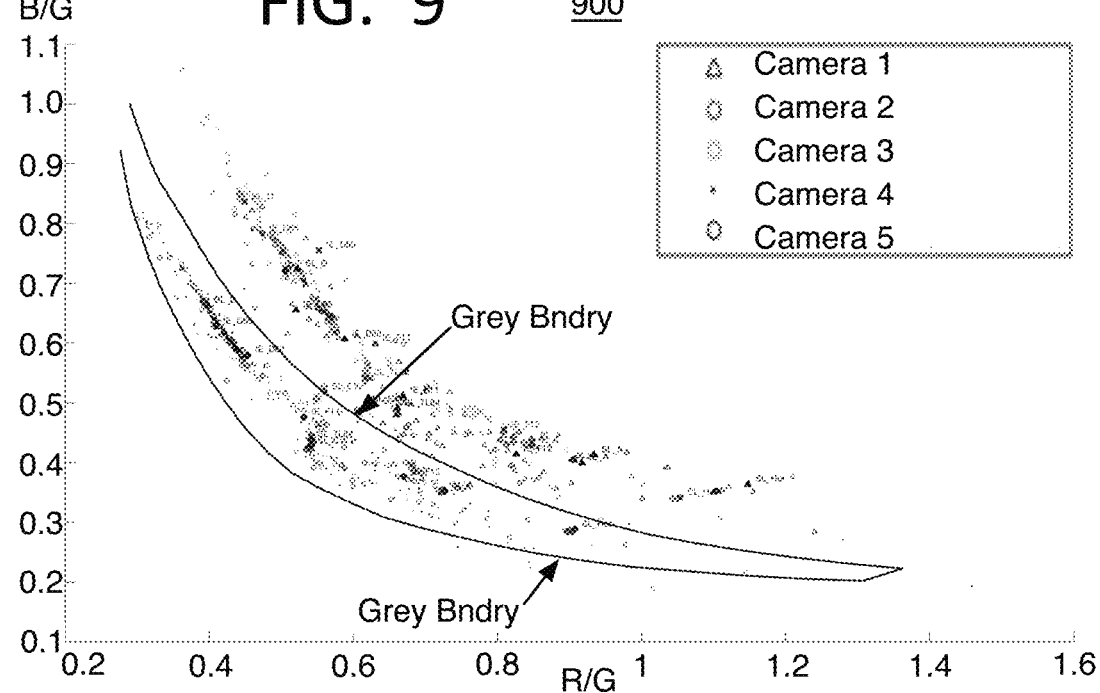

The resulting white map accurately covers daylight/skylight and incandescent types of light sources, and many other light sources whose chromaticity is close to Planck locus or CIE Daylight locus (even if their SPD is far from the used SPDs. Example final resulting white maps are illustrated in FIGS. 7-9 (graphs 700, 800, and 900) for the three cameras that were tested below and in linearized raw [R/G, B/G] color space generated automatically from the generic CIE 1931 xy white map.

Test Results

Figure 10A:
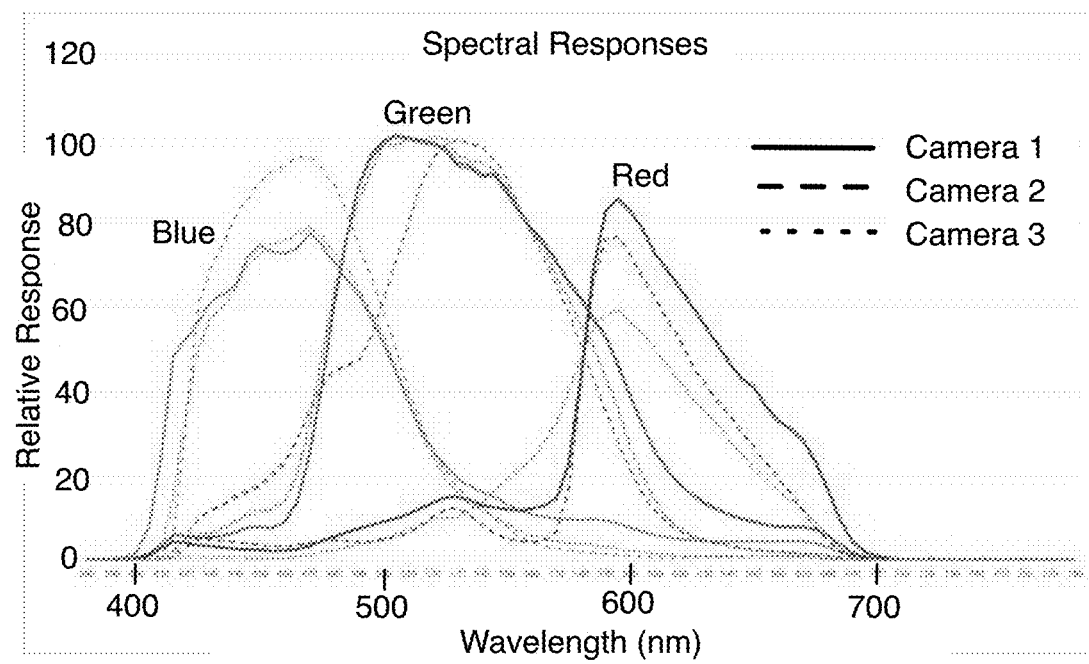
FIG. 10A is a graph of spectral responses of three cameras tested according to at least one of the implementations herein.
Figure 10B:
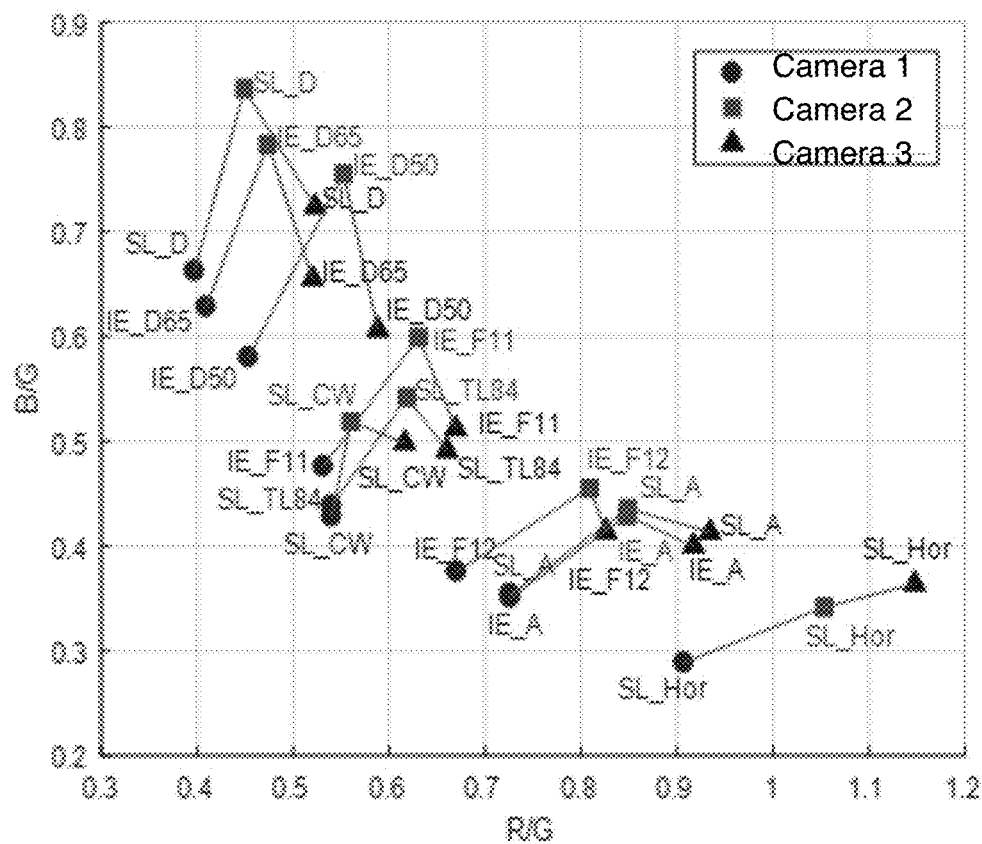
FIG. 10B is a graph of chromaticity responses of the three cameras tested according to at least one of the implementations herein.

A pre-established database was used in training, validation, and testing of cameras to test CNN performance as well as both camera and scene invariance. Currently, the database contains thousands of versatile indoor and outdoor images captured in a number of countries around the world at various seasons and times of day, using three different cameras that have different spectral responses as shown on spectral power distribution graph 1000 of FIG. 10A. A R/G-B/G color space graph 1050 (FIG. 10B) illustrates how these different spectral responses lead to different white points for the same example light sources. The commonly used angular error of equation (1) above and between the estimated and ground truth illuminant estimates was used as the error metrics. The same scenes were captured simultaneously with each of the three cameras, so and only the camera is different to enable testing camera invariance separately from scene invariance.

Referring to FIGS. 11-18, images 1100 to 1800 exemplify different magnitudes of angular error to give a better idea of what the error magnitudes indicate and to exemplify the IQ tuning impact from different magnitudes of errors. The images 1100 to 1400 show the ground truth while corresponding images 1500 to 1800 show the angular error images. The images are from the database used for the experiments. The algorithm that produced these errors is an example tuning-free conventional AWB algorithm from the academia. In other words, metrics such as DeltaE2000 are not commonly used for AWB comparisons at an algorithm level so that the subjective IQ tuning decisions of the color conversion do not affect the outcome and the tests can focus on the accuracy of the white point alone. This can be done in tests when the white point can be known, i.e., not when testing final camera devices as black boxes.

As a rough guideline, below 3° error is good accuracy and error not likely to cause noticeable color error, whereas above 5° error is likely to cause a noticeable color error. The perceived subjective color quality impact on a particular image depends on various factors such as the color conversion used (magnitudes of coefficients and possible color saturation boost), image contents (important memory colors or not), observer preferences, etc.

Trials were performed where the CNN algorithm was applied alone and with non-CNN algorithms using the weighting method described herein, and both were compared to a conventional algorithm. A reduction in the number of images with major errors has the most visible IQ impact for end users. It was found that the CNN alone still may have more errors than conventional algorithms, but when the confidence estimation according to the present methods is utilized for the combined CNN and non-CNN algorithms so that CNN only is used when it is strong, then the method shows significant reduction in the proportion of major errors. A good improvement also is achieved for the camera in the spectral characterization process disclosed herein. This proves that very good results can be achieved for a completely new camera module with minor effort, rather than the lengthy effort that is traditionally required to capture a sufficient amount of versatility for the CNN dataset to achieve high quality results and to generate the white map tunings.

Regarding the processes described above, any one or more of the operations of the processes (or network) of FIGS. 2 and 4A-5B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 19:
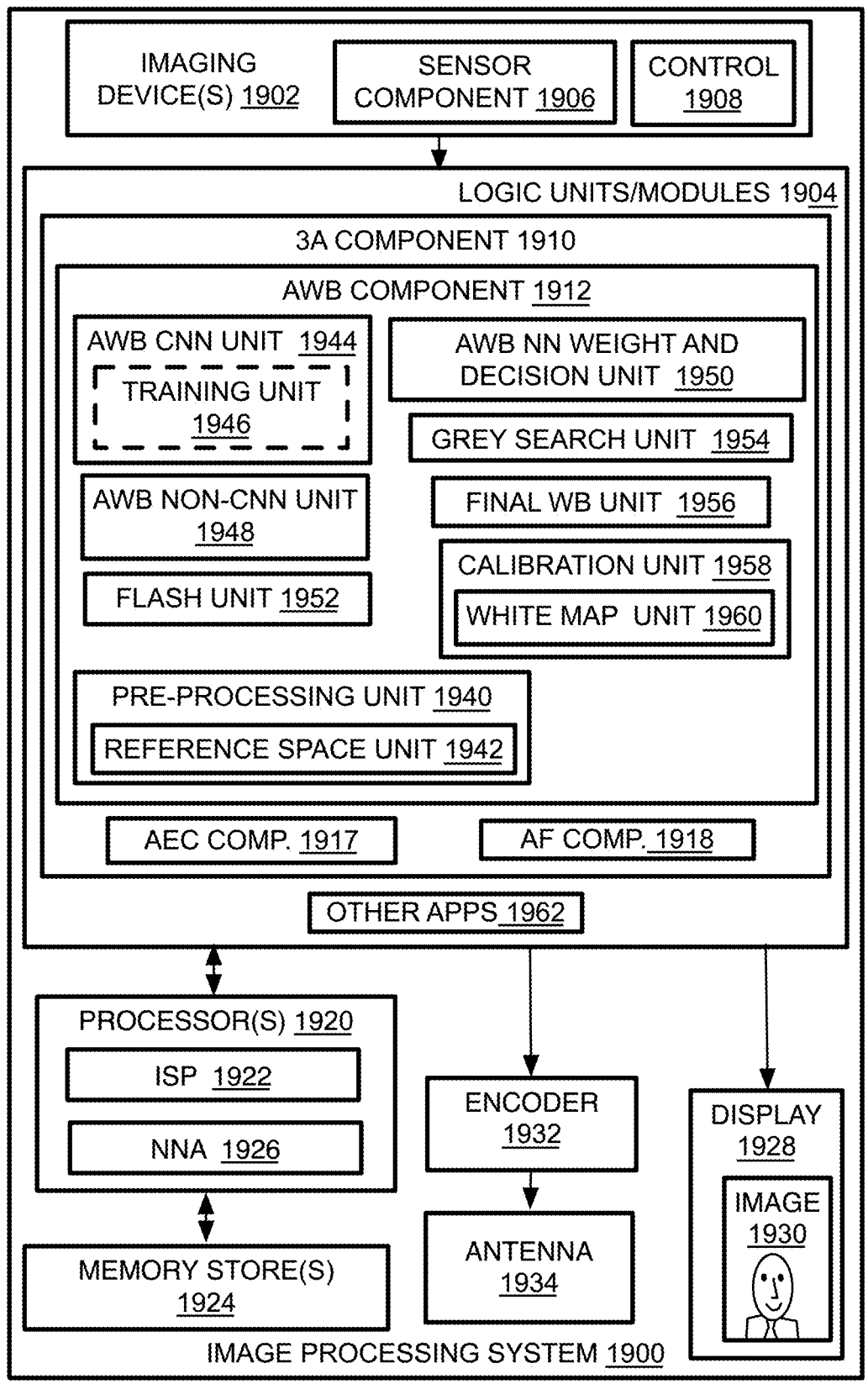
FIG. 19 is an illustrative diagram of an example system.

Referring to FIG. 19, an example image processing system 1900 is arranged in accordance with at least some implementations of the present disclosure. In various implementations, the example image processing system 1900 may have an imaging device 1902 to form or receive captured image data. This can be implemented in various ways. Thus, in one form, the image processing system 1900 may be a digital camera or other image capture device, and imaging device 1902, in this case, may be the camera hardware and camera sensor software, module, or component. In other examples, imaging processing system 1900 may have an imaging device 1902 that includes or may be a camera, and logic modules 1904 may communicate remotely with, or otherwise may be communicatively coupled to, the imaging device 1902 for further processing of the image data.

In either case, such technology may include a camera such as a digital camera system, a dedicated camera device, or an imaging phone, whether a still picture or video camera or some combination of both. Thus, in one form, imaging device 1902 may include camera hardware and optics including one or more sensors as well as auto-focus, zoom, aperture, ND-filter, auto-exposure, flash, and actuator controls. These controls may be part of a sensor module or component 1906 for operating the sensor. The sensor component 1906 may be part of the imaging device 1902, or may be part of the logical modules 1904 or both. Such sensor component can be used to generate images for a viewfinder and take still pictures or video. The imaging device 1902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1902 may be provided with an eye tracking camera. The imaging device 1902 also may have a lens actuator or control 1908 that has a lens and a lens driver or driver logic that receives commands to move the lens and/or applies an electrical current to move the lens.

In the illustrated example, the logic modules 1904 may include the 3A component 1910 that, in turn, may include an AF component 1918, an automatic white balance (AWB) component 1912, and an automatic exposure control (AEC) component 1917. The 3A component unit 1910 also may have other components such as a lens shading correction component and a light source estimation unit not shown here. The AWB component 1912 may have a pre-processing unit 1940 that performs tasks mentioned above and may optionally include a reference space unit 1942 operated as described above to increase camera invariance. The AWB component 1912 also may have an AWB CNN unit 1944 with a training unit 1946 that may be remote from the physical device 1902 and may operate remotely offline if not performed while physically on device 1900/1902, and an AWB non-CNN unit as well as an AWB NN weight and decision unit 1950 that operate to provide the increased scene invariance as explained above. A flash unit 1952 and grey-search unit 1954 are provided for further refinement of a base white point, and as described above, the grey-search unit 1954 optionally may receive white maps from a calibration unit 1958 that uses a white map unit 1960 arranged to increase IQ tuning efficiency all as described above in detail. A final WB unit 1956 provides final white points as well as a CCT and to other applications 1962 to process and display images also as described above. The tasks performed by these units are described above with where the description of the task or similar units performing the tasks corresponds to, or is associated with, the name of the unit here on device 1900. The 3A component unit 1910 may be operated by, or even entirely or partially located at, processor(s) 1920, and which may include one or more ISPs 1922 (or DSPs) and/or one or more neural network accelerators (NNAs) 1926 to perform the operations. The logic modules 1904 may be communicatively coupled to the components of the imaging device 1902 in order to receive raw image data. In these cases, it is assumed the logic modules 1904 are considered to be separate from the imaging device. This need not be so, and the logic modules very well may be considered to be part of the imaging device as well.

The image processing system 1900 may have one or more processors 1920 which may include a dedicated image signal processor (ISP) 1922 such as the Intel Atom, memory stores 1924 which may or may not hold AWB algorithm data and image data in various forms and versions, one or more displays 1928 to provide images 1930, encoder 1932, and antenna 1934. In one example implementation, the image processing system 1900 may have the display 1928, at least one processor 1920 communicatively coupled to the display, at least one memory 1924 communicatively coupled to the processor to perform the operations described herein as explained above. The encoder 1932 and antenna 1934 may be provided to compress the modified image date for transmission to other devices that may display or store the image and provide whatever compression/decompression support data that is needed. It will be understood that the image processing system 1900 may also include a decoder (or encoder 1932 may include a decoder) to receive and decode image data for processing by the system 1900. Otherwise, the processed image 1930 may be displayed on display 1928 or stored in memory 1924. As illustrated, any of these components may be capable of communication with one another and/or communication with portions of logic modules 1904 and/or imaging device 1902. Thus, processors 1920 may be communicatively coupled to both the image device 1902 and the logic modules 1904 for operating those components. By one approach, although image processing system 1900, as shown in FIG. 19, may include one particular set of blocks or actions associated with particular components or modules, these blocks or actions may be associated with different components or modules than the particular component or module illustrated here.

Figure 20:
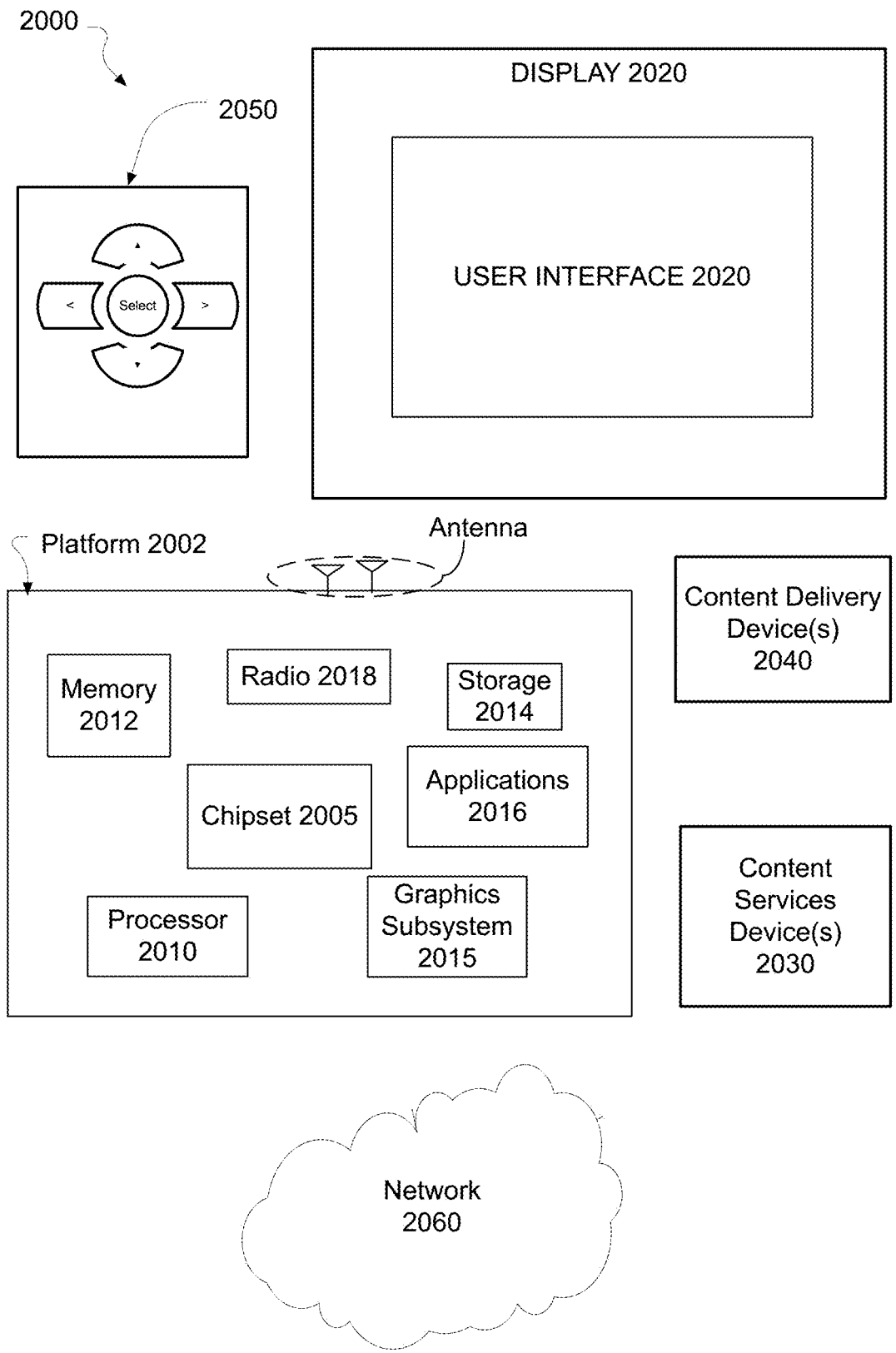
FIG. 20 is an illustrative diagram of another example system.

Referring to FIG. 20, an example system 2000 in accordance with the present disclosure operates one or more aspects of the image processing system described herein. It will be understood from the nature of the system components described below that such components may be associated with, or used to operate, certain part or parts of the image processing system described above. In various implementations, system 2000 may be a media system although system 2000 is not limited to this context. For example, system 2000 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2000 includes a platform 2002 coupled to a display 2020. Platform 2002 may receive content from a content device such as content services device(s) 2030 or content delivery device(s) 2040 or other similar content sources. A navigation controller 2050 including one or more navigation features may be used to interact with, for example, platform 2002 and/or display 2020. Each of these components is described in greater detail below.

In various implementations, platform 2002 may include any combination of a chipset 2005, processor 2010, memory 2012, storage 2014, graphics subsystem 2015, applications 2016 and/or radio 2018. Chipset 2005 may provide intercommunication among processor 2010, memory 2012, storage 2014, graphics subsystem 2015, applications 2016 and/or radio 2018. For example, chipset 2005 may include a storage adapter (not depicted) capable of providing intercommunication with storage 2014.

Processor 2010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2010 may be dual-core processor(s), dual-core mobile processor(s), and so forth.

Memory 2012 may be implemented as a volatile memory device such as, but not limited to, a Random Access Memory (RAM), Dynamic Random Access Memory (DRAM), or Static RAM (SRAM).

Storage 2014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2014 may include technology to increase the storage performance enhanced protection for valuable digital media when multiple hard drives are included, for example.

Graphics subsystem 2015 may perform processing of images such as still or video for display including a preview screen of a camera. Graphics subsystem 2015 may be a graphics processing unit (GPU) or a visual processing unit (VPU), for example. An analog or digital interface may be used to communicatively couple graphics subsystem 2015 and display 2020. For example, the interface may be any of a High-Definition Multimedia Interface, Display Port, wireless HDMI, and/or wireless HD compliant techniques. Graphics subsystem 2015 may be integrated into processor 2010 or chipset 2005. In some implementations, graphics subsystem 2015 may be a stand-alone card communicatively coupled to chipset 2005. The graphics subsystem 2015 and/or processor 2010 may include or be one or more image signal processors (ISPs) as well. The graphics subsystem and/or processor 2010 also may include one or more neural network accelerators.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 2018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2018 may operate in accordance with one or more applicable standards in any version.

In various implementations, display 2020 may include any television type monitor or display. Display 2020 may include, for example, a computer display screen, touch screen display, video monitor, television-like device, and/or a television. Display 2020 may be digital and/or analog. In various implementations, display 2020 may be a holographic display. Also, display 2020 may be a transparent surface that may receive a visual projection. Such projections may convey various forms of information, images, and/or objects. For example, such projections may be a visual overlay for a mobile augmented reality (MAR) application. Under the control of one or more software applications 2016, platform 2002 may display user interface 2022 on display 2020.

In various implementations, content services device(s) 2030 may be hosted by any national, international and/or independent service and thus accessible to platform 2002 via the Internet, for example. Content services device(s) 2030 may be coupled to platform 2002 and/or to display 2020. Platform 2002 and/or content services device(s) 2030 may be coupled to a network 2060 to communicate (e.g., send and/or receive) media information to and from network 2060. Content delivery device(s) 2040 also may be coupled to platform 2002 and/or to display 2020.

In various implementations, content services device(s) 2030 may include a cable television box, personal computer, network, telephone, Internet enabled devices or appliance capable of delivering digital information and/or content, and any other similar device capable of unidirectionally or bidirectionally communicating content between content providers and platform 2002 and/display 2020, via network 2060 or directly. It will be appreciated that the content may be communicated unidirectionally and/or bidirectionally to and from any one of the components in system 2000 and a content provider via network 2060. Examples of content may include any media information including, for example, video, music, medical and gaming information, and so forth.

Content services device(s) 2030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2002 may receive control signals from navigation controller 2050 having one or more navigation features. The navigation features of controller 2050 may be used to interact with user interface 2022, for example. In implementations, navigation controller 2050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2050 may be replicated on a display (e.g., display 2020) by movements of a pointer, cursor, focus ring, or other visual indicators displayed on the display. For example, under the control of software applications 2016, the navigation features located on navigation controller 2050 may be mapped to virtual navigation features displayed on user interface 2022, for example. In implementations, controller 2050 may not be a separate component but may be integrated into platform 2002 and/or display 2020. The present disclosure, however, is not limited to the elements or in the context shown or described herein.

In various implementations, drivers (not shown) may include technology to enable users to instantly turn on and off platform 2002 like a television with the touch of a button after initial boot-up, when enabled, for example. Program logic may allow platform 2002 to stream content to media adaptors or other content services device(s) 2030 or content delivery device(s) 2040 even when the platform is turned "off." In addition, chipset 2005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2000 may be integrated. For example, platform 2002 and content services device(s) 2030 may be integrated, or platform 2002 and content delivery device(s) 2040 may be integrated, or platform 2002, content services device(s) 2030, and content delivery device(s) 2040 may be integrated, for example. In various implementations, platform 2002 and display 2020 may be an integrated unit. Display 2020 and content service device(s) 2030 may be integrated, or display 2020 and content delivery device(s) 2040 may be integrated, for example. These examples are not meant to limit the present disclosure.

In various implementations, system 2000 may be implemented as a wireless system, a wired system, or a combination of both. When implemented as a wireless system, system 2000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 20.

Figure 21:
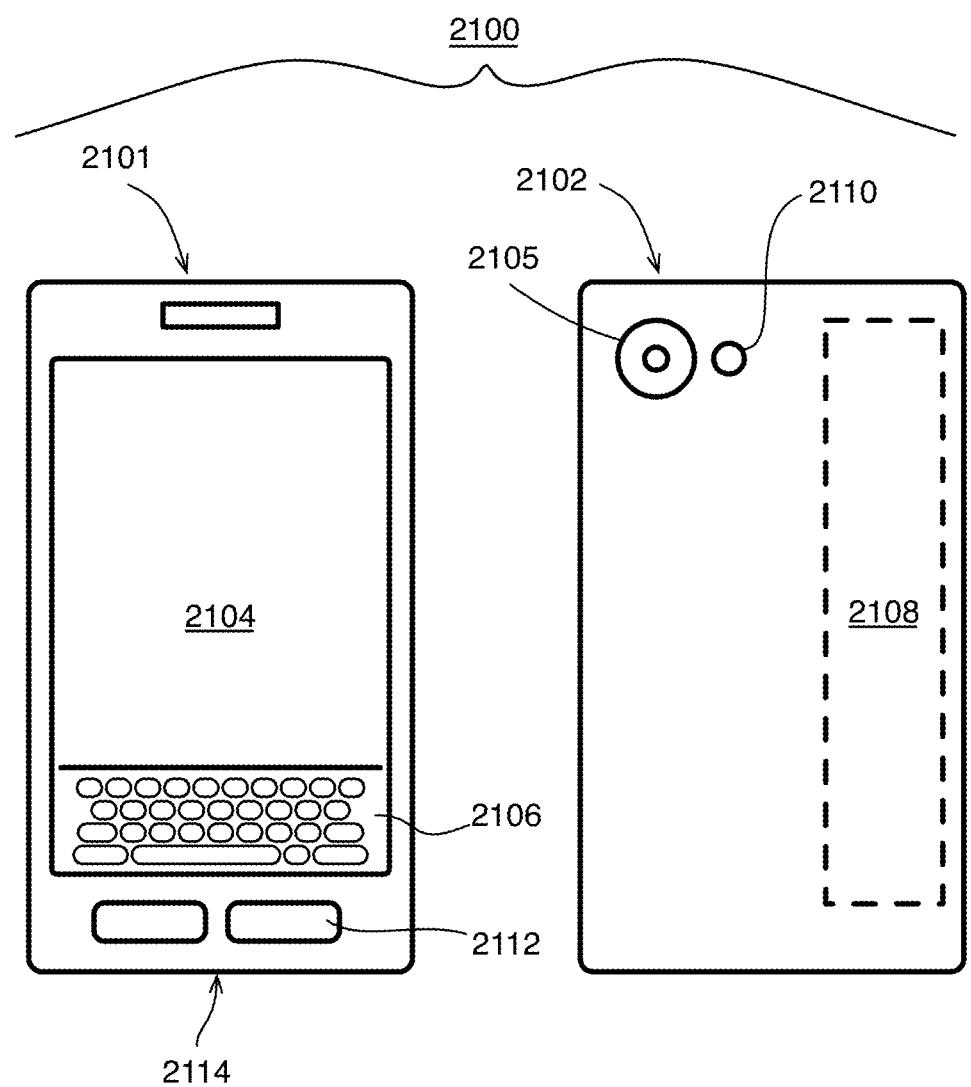
FIG. 21 illustrates another example device, all arranged in accordance with at least some implementations of the present disclosure.

Referring to FIG. 21, and as described above, systems 1900 and 2000 may be embodied in varying physical styles or form factors including a small form factor device 2100, arranged in accordance with at least some implementations of the present disclosure. Thus, in some examples, systems 1900 or 2000 may be implemented via device 2100. In other examples, other devices or systems, or portions thereof may be implemented via device 2100. In various implementations, for example, device 2100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 21, device 2100 may include a housing with a front 2101 and a back 2102. Device 2100 includes a display 2104, an input/output (I/O) device 2106, and an integrated antenna 2108. Device 2100 also may include navigation features 2112. I/O device 2106 may include any suitable I/O device for entering information into a mobile computing device. Examples for I/O device 2106 may include an alphanumeric keyboard, a numeric keypad, a touch pad, input keys, buttons, switches, microphones, speakers, voice recognition device and software, and so forth. Information also may be entered into device 2100 by way of microphone 201, or may be digitized by a voice recognition device. As shown, device 2100 may include a camera 2105 (e.g., including a lens, an aperture, and an imaging sensor) and a flash 2110 integrated into back 2102 (or elsewhere) of device 2100.

Various implementations may be implemented using hardware elements, and including those specified above that are implemented as neural network accelerators (NNAs). Otherwise, when not specified, the implementations may be implemented as hardware elements, software elements, or a combination of both. Examples of other hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of automatic white balancing for image processing, comprises obtaining image data of at least one image; inputting the image data to at least one convolutional neural network (CNN) arranged to provide at least one automatic white balance (AWB) white point estimate and having at least one chromaticity map channel and at least one confidence map channel with confidence estimate values to be used as weights to apply to values of the chromaticity map channel(s); determining a normalizing confidence map weight based at least in part on the individual confidence estimate values; and determining a base white point estimate comprising using both a weighted white point estimate of the CNN and weighted by the normalizing confidence map weight, and a weighted white point estimate of at least one non-CNN AWB algorithm.

By another implementation, the method may comprise wherein determining a normalizing confidence map weight comprises normalizing the confidence estimate values by dividing an average of the confidence estimate values by a standard deviation of the confident estimate values; wherein the white point estimates are proportioned by setting the sum of (1) the weight of the CNN and (2) sum of weights of the non-CNN algorithms to equal 1; wherein determining a base white point estimate comprises weighting the white point estimate of the CNN and the non-CNN algorithms respectively with their own weights, and then summing the weighted white point estimates; wherein the individual weight(s) of the non-CNN algorithm is at least partly based on a color gamut size for the at least one image so that the larger the color gamut, the greater the weight; wherein the individual weight(s) of the non-CNN algorithm are determined by using a separate neural network to evaluate confidence values for the non-CNN algorithm; wherein the at least one non-CNN AWB algorithm is related to at least one algorithm of maxRGB, grey-world, shades of grade, grey-edge, gamut mapping, and color correlation; wherein the base white point estimate is formed entirely from the CNN white point estimate while the non-CNN algorithms have a weight of zero or close to zero, and the base white point estimate is formed entirely from one or more non-CNN algorithms when the CNN algorithm has a weight of zero or close to zero.

The method also may comprise operating an adaptive pooling layer of the CNN comprising weighting at least one of the chromaticity map channels by using the confidence estimate values as weight values applied to the chromaticity map channel; outputting a white point estimate from the CNN by using resulting weighted values of the chromaticity map channel; and using the white point estimate to set chromaticity values for the at least one image; wherein weighting at least one of the chromaticity map channels comprises multiplying the confidence estimate values by corresponding chromaticity values element by element to apply the confidence estimate values as weights; wherein operating the adaptive pooling layer comprising obtaining a single representative value from each chromaticity channel as a value of a base white point estimate of the CNN, wherein the single representative value is the mean of weighted chromaticity values of a chromaticity channel; operating two consecutive deep automatic white balance (AWB) convolutional layers of the CNN comprising a first deep AWB convolutional layer that reduces the CNN to 64 channels, and a second deep AWB convolutional layer that reduces the 64 channels to four channels including one of the confidence map channels and three chromaticity map channels each being for one of a RGB color space primary color, wherein the four channels are provided to the adaptive pooling layer; transforming the image data of the at least one image from sensor-specific image data into a reference space; operating at least the CNN in the reference space; and transforming resulting white point estimates from the reference space back to sensor-specific image data; generating a white map of viable white points to perform a grey-search to determine grey areas of an image, and the generating comprising: obtaining offline image data indicating an illumination chromaticity distribution for a camera sensor in a CIExy color space; generating a spectral characterization of the camera sensor by using the illumination chromaticity distribution; estimating a spectral power distribution (SPD) for individual CIExy coordinates using the spectral characterization; and forming at least one white map of viable white points by using the spectral power distribution.

By yet another implementation, a computer implemented system of automatic white balancing for image processing comprises at least one camera capturing at least one image of a video sequence or still photograph; a display; at least one memory storing image data of the at least one image; and at least one processor communicatively coupled to the display and the memory, the processor being arranged to operate by; obtaining image data of the at least one image; inputting the image data to at least one convolutional neural network (CNN) arranged to output at least one automatic white balance (AWB) CNN white point estimate and having at least one chromaticity map channel and at least one confidence map channel with confidence estimate values to be used as weights to apply to values of the chromaticity map channel(s); determining whether or not the CNN white point estimate will be sufficiently accurate comprising using the confidence estimate values; and providing a base white point that includes a proportion of the CNN white point estimate depending on the determined accuracy, and including 0 percent of the CNN white point estimate wherein none of the CNN white point estimate forms the base white point, and 100% of the CNN white point estimate wherein the CNN white point estimate forms 100% of the base white point.

By another example, the system includes that wherein the at least one processor is arranged to provide all three alternatives of providing the base white point: (a) based on the CNN white point estimate alone, (b) based on at least one non-CNN AWB white point estimate generated by using an AWB algorithm without including the CNN white point estimate, and (c) a proportion of the CNN white point estimate and proportion of at least one non-CNN AWB white point estimate; wherein the base white point is formed by proportioning multiple white point estimates when the CNN white point estimate is found to be inaccurate; wherein determining whether or not the CNN white point estimate will be sufficiently accurate comprises computing the base white point by using both a weighted CNN white point estimate that indicates the accuracy of the CNN white point estimate and a weighted white point estimate of at least one non-CNN AWB algorithm, wherein the weighted white point estimate of the CNN is a normalizing confidence map weight obtained by normalizing the confidence estimate values comprising using both an average of the confidence estimate values and a standard deviation of the confidence estimate values, wherein the normalizing confidence map weight is computed by dividing the average of the confidence estimate values by the standard deviation of the confidence estimate values.

By one approach, at least one computer readable medium comprises a plurality of instructions that in response to being executed on a computing device, causes the computing device to operate by: obtaining offline image data indicating an illumination chromaticity distribution for a camera sensor in a CIExy color space; generating a spectral characterization of the camera sensor by using the illumination chromaticity distribution; estimating a spectral power distribution (SPD) for individual CIExy coordinates using the spectral characterization; forming at least one white map of viable white points by using the spectral power distribution; and using the white map to determine a white point estimate of an image.

By other approaches, the instructions cause the computing device to wherein the spectral characterization of the camera sensor is formed by measuring the response of the camera sensor at different visible wavelengths; wherein the instructions cause the computing device to operate by calculating grey boundary points (BPs) from the white map by weighting the correlated color temperature (CCT) SPDs with XYZ basis functions to move the corresponding CIE 1931 xy coordinate from an $xy_{CCT}$ to an $xy_{BP}$; wherein the instructions cause the computing device to operate by: inputting run-time image data to at least one convolutional neural network (CNN) arranged to provide at least one automatic white balance (AWB) white point estimate and having at least one chromaticity map channel and at least one confidence map channel with confidence estimate values to be used as weights to apply to values of the chromaticity map channel(s); determining a single normalizing confidence map weight based at least in part on the individual confidence estimate values; and determining a base white point estimate comprising using (a) the single normalizing confidence map weight and white point estimate of the CNN and (b) a weight and white point estimate of at least one non-CNN AWB algorithm, wherein the base white point estimate is refined by the use of the white map to form the white point.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic white balancing for image processing, comprising:
obtaining image data of at least one image;
inputting the image data to at least one convolutional neural network (CNN) arranged to provide at least one automatic white balance (AWB) white point estimate and having at least one chromaticity map channel and at least one confidence map channel with confidence estimate values to be used as weights to apply to values of the chromaticity map channel(s);
determining a normalizing confidence map weight based at least in part on the individual confidence estimate values; and
determining a base white point estimate comprising using both a weighted white point estimate of the CNN and weighted by the normalizing confidence map weight, and a weighted white point estimate of at least one non-CNN AWB algorithm.

2. The method of claim 1 wherein determining a normalizing confidence map weight comprises normalizing the confidence estimate values by dividing an average of the confidence estimate values by a standard deviation of the confident estimate values.

3. The method of claim 1 wherein the white point estimates are proportioned by setting the sum of (1) the weight of the CNN and (2) sum of weights of the non-CNN algorithms to equal 1.

4. The method of claim 1 wherein determining a base white point estimate comprises weighting the white point estimate of the CNN and the non-CNN algorithms respectively with their own weights, and then summing the weighted white point estimates.

5. The method of claim 1 wherein the individual weight(s) of the non-CNN algorithm is at least partly based on a color gamut size for the at least one image so that the larger the color gamut, the greater the weight.

6. The method of claim 1 wherein the individual weight(s) of the non-CNN algorithm are determined by using a separate neural network to evaluate confidence values for the non-CNN algorithm.

7. The method of claim 1 wherein the at least one non-CNN AWB algorithm is related to at least one algorithm of maxRGB, grey-world, shades of grade, grey-edge, gamut mapping, and color correlation.

8. The method of claim 1 wherein the base white point estimate is formed entirely from the CNN white point estimate while the non-CNN algorithms have a weight of zero or close to zero, and the base white point estimate is formed entirely from one or more non-CNN algorithms when the CNN algorithm has a weight of zero or close to zero.

9. The method of claim 1 comprising operating an adaptive pooling layer of the CNN comprising weighting at least one of the chromaticity map channels by using the confidence estimate values as weight values applied to the chromaticity map channel;
outputting a white point estimate from the CNN by using resulting weighted values of the chromaticity map channel; and
using the white point estimate to set chromaticity values for the at least one image.

10. The method of claim 9 wherein weighting at least one of the chromaticity map channels comprises multiplying the confidence estimate values by corresponding chromaticity values element by element to apply the confidence estimate values as weights.

11. The method of claim 9 wherein operating the adaptive pooling layer comprising obtaining a single representative value from each chromaticity channel as a value of a base white point estimate of the CNN.

12. The method of claim 11 wherein the single representative value is the mean of weighted chromaticity values of a chromaticity channel.

13. The method of claim 9 comprising operating two consecutive deep automatic white balance (AWB) convolutional layers of the CNN comprising a first deep AWB convolutional layer that reduces the CNN to 64 channels, and a second deep AWB convolutional layer that reduces the 64 channels to four channels including one of the confidence map channels and three chromaticity map channels each being for one of a RGB color space primary color, wherein the four channels are provided to the adaptive pooling layer.

14. The method of claim 1 comprising transforming the image data of the at least one image from sensor-specific image data into a reference space; operating at least the CNN in the reference space; and transforming resulting white point estimates from the reference space back to sensor-specific image data.

15. The method of claim 1 comprising generating a white map of viable white points to perform a grey-search to determine grey areas of an image, and the generating comprising:
obtaining offline image data indicating an illumination chromaticity distribution for a camera sensor in a CIExy color space;
generating a spectral characterization of the camera sensor by using the illumination chromaticity distribution;
estimating a spectral power distribution (SPD) for individual CIExy coordinates using the spectral characterization; and
forming at least one white map of viable white points by using the spectral power distribution.

16. A computer-implemented system of automatic white balancing for image processing comprising:
at least one camera capturing at least one image of a video sequence or still photograph;
a display;
at least one memory storing image data of the at least one image; and
at least one processor communicatively coupled to the display and the memory, the processor being arranged to operate by;
obtaining image data of the at least one image;
inputting the image data to at least one convolutional neural network (CNN) arranged to output at least one automatic white balance (AWB) CNN white point estimate and having at least one chromaticity map channel and at least one confidence map channel with confidence estimate values to be used as weights to apply to values of the chromaticity map channel(s);
determining whether or not the CNN white point estimate will be sufficiently accurate comprising using the confidence estimate values; and
providing a base white point that includes a proportion of the CNN white point estimate depending on the determined accuracy, and including 0 percent of the CNN white point estimate wherein none of the CNN white point estimate forms the base white point, and 100% of the CNN white point estimate wherein the CNN white point estimate forms 100% of the base white point.

17. The system of claim 16 wherein the at least one processor is arranged to provide all three alternatives of providing the base white point: (a) based on the CNN white point estimate alone, (b) based on at least one non-CNN AWB white point estimate generated by using an AWB algorithm without including the CNN white point estimate, and (c) a proportion of the CNN white point estimate and proportion of at least one non-CNN AWB white point estimate.

18. The system of claim 16 wherein the base white point is formed by proportioning multiple white point estimates when the CNN white point estimate is found to be inaccurate.

19. The system of claim 16 wherein determining whether or not the CNN white point estimate will be sufficiently accurate comprises computing the base white point by using both a weighted CNN white point estimate that indicates the accuracy of the CNN white point estimate and a weighted white point estimate of at least one non-CNN AWB algorithm.

20. The method of claim 19 wherein the weighted white point estimate of the CNN is a normalizing confidence map weight obtained by normalizing the confidence estimate values comprising using both an average of the confidence estimate values and a standard deviation of the confidence estimate values.

21. The system of claim 20 wherein the normalizing confidence map weight is computed by dividing the average of the confidence estimate values by the standard deviation of the confidence estimate values.

22. At least one non-transitory computer readable medium comprising a plurality of instructions that in response to being executed on a computing device, causes the computing device to operate by:
obtaining offline image data indicating an illumination chromaticity distribution for a camera sensor in a CIExy color space;
generating a spectral characterization of the camera sensor by using the illumination chromaticity distribution;
estimating a spectral power distribution (SPD) for individual CIExy coordinates using the spectral characterization;
forming at least one white map of viable white points by using the spectral power distribution; and
using the white map to determine a white point estimate of an image.

23. The medium of claim 22 wherein the spectral characterization of the camera sensor is formed by measuring the response of the camera sensor at different visible wavelengths.

24. The medium of claim 22 wherein the instructions cause the computing device to operate by calculating grey boundary points (BPs) from the white map by weighting the correlated color temperature (CCT) SPDs with XYZ basis functions to move the corresponding CIE 1931 xy coordinate from an $xy_{CCT}$ to an $xy_{BP}$.

25. The medium of claim 22 wherein the instructions cause the computing device to operate by:
inputting run-time image data to at least one convolutional neural network (CNN) arranged to provide at least one automatic white balance (AWB) white point estimate and having at least one chromaticity map channel and at least one confidence map channel with confidence estimate values to be used as weights to apply to values of the chromaticity map channel(s);
determining a single normalizing confidence map weight based at least in part on the individual confidence estimate values; and
determining a base white point estimate comprising using (a) the single normalizing confidence map weight and white point estimate of the CNN and (b) a weight and white point estimate of at least one non-CNN AWB algorithm, wherein the base white point estimate is refined by the use of the white map to form the white point.

* * * * *